(12) United States Patent
Mitsui

(10) Patent No.: US 11,016,782 B2
(45) Date of Patent: May 25, 2021

(54) INFORMATION PROCESSING APPARATUS, INFORMATION PROCESSING METHOD, AND STORAGE MEDIUM

(71) Applicant: CANON KABUSHIKI KAISHA, Tokyo (JP)

(72) Inventor: Akihiro Mitsui, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/175,428

(22) Filed: Oct. 30, 2018

(65) Prior Publication Data

US 2019/0065215 A1 Feb. 28, 2019

Related U.S. Application Data

(63) Continuation of application No. 15/698,524, filed on Sep. 7, 2017, now Pat. No. 10,152,332, which is a continuation of application No. 13/459,709, filed on Apr. 30, 2012, now Pat. No. 9,785,445.

(30) Foreign Application Priority Data

May 2, 2011 (JP) ................................. 2011-103005

(51) Int. Cl.
   *G06F 3/12* (2006.01)
   *G06K 15/02* (2006.01)
   *G06F 9/4401* (2018.01)
   *G06F 9/451* (2018.01)

(52) U.S. Cl.
   CPC ............ *G06F 9/4411* (2013.01); *G06F 9/451* (2018.02); *G06F 3/1205* (2013.01); *G06F 3/1206* (2013.01); *G06F 3/1225* (2013.01)

(58) Field of Classification Search
   CPC combination set(s) only.
   See application file for complete search history.

(56) References Cited

U.S. PATENT DOCUMENTS

| | | | |
|---|---|---|---|
| 6,184,998 B1 | 2/2001 | Tebeka | |
| 6,498,612 B1 | 12/2002 | Brown et al. | |
| 7,523,191 B1 | 4/2009 | Thomas et al. | |
| 7,917,855 B1* | 3/2011 | Satish | G06F 9/451 715/744 |
| 2002/0122489 A1 | 9/2002 | Kuniba | |
| 2003/0043396 A1 | 3/2003 | Klosterman et al. | |
| 2003/0200427 A1* | 10/2003 | Kemp | G06F 9/4411 713/1 |
| 2004/0111499 A1 | 6/2004 | Dobrowski et al. | |

(Continued)

FOREIGN PATENT DOCUMENTS

| | | |
|---|---|---|
| EP | 1835395 A2 | 9/2007 |
| JP | 11-143664 A | 5/1999 |

(Continued)

OTHER PUBLICATIONS

XP002680487; "Setting Up a Reliable Web Server by Using Windows 2000"; Microsoft Corp., Oct. 11, 2007.

*Primary Examiner* — Helen Zong
(74) *Attorney, Agent, or Firm* — Canon U.S.A., Inc. IP Division

(57) ABSTRACT

A printer driver and an advanced UI application are associated with each other during installation, and the advanced UI application is activated in a different process using a COM when the printer driver is called.

28 Claims, 26 Drawing Sheets

(56) References Cited

U.S. PATENT DOCUMENTS

| | | | |
|---|---|---|---|
| 2004/0223182 A1* | 11/2004 | Minagawa | G06F 3/1203 358/1.15 |
| 2005/0044541 A1 | 2/2005 | Parthasarathy et al. | |
| 2005/0157321 A1 | 7/2005 | Alacar | |
| 2005/0185211 A1* | 8/2005 | Foehr | G06F 3/1208 358/1.15 |
| 2005/0257226 A1 | 11/2005 | Belvin et al. | |
| 2006/0031755 A1 | 2/2006 | Kashi | |
| 2006/0033944 A1* | 2/2006 | Kadota | G06F 3/1259 358/1.13 |
| 2006/0077455 A1 | 4/2006 | Vvatanabe | |
| 2006/0087680 A1 | 4/2006 | Maeda | |
| 2007/0067321 A1* | 3/2007 | Bissett | G06F 9/4488 |
| 2007/0179883 A1 | 8/2007 | Questembert | |
| 2007/0260577 A1 | 11/2007 | Bernabeu-Auban et al. | |
| 2009/0070404 A1* | 3/2009 | Mazzaferri | G06F 9/542 709/202 |
| 2009/0109473 A1 | 4/2009 | Kato | |
| 2009/0109475 A1 | 4/2009 | Honda | |
| 2009/0237724 A1 | 9/2009 | Furuya | |
| 2009/0244585 A1 | 10/2009 | Mitsui | |
| 2010/0082784 A1 | 4/2010 | Rosenblatt et al. | |
| 2010/0238480 A1 | 9/2010 | Fukunishi | |
| 2010/0315662 A1 | 12/2010 | Fukunishi | |
| 2011/0173618 A1 | 7/2011 | Laborczfalvi et al. | |
| 2012/0218576 A1 | 8/2012 | Sekine et al. | |
| 2012/0281245 A1 | 11/2012 | Mitsui | |
| 2019/0065215 A1* | 2/2019 | Mitsui | G06F 9/4411 |

FOREIGN PATENT DOCUMENTS

| | | |
|---|---|---|
| JP | 2010-284852 A | 12/2010 |
| JP | 4661939 B2 | 3/2011 |
| KR | 10-2009-0111957 A | 10/2009 |
| WO | 2007108547 A1 | 9/2007 |

* cited by examiner

FIG.6

```xml
<?xml version="1.0" encoding="UTF-8" ?>
<psf:PrintTicket
xmlns:psf="http://schemas.microsoft.com/windows/2003/08/printing/printschemaframework"
xmlns:xsi="http://www.w3.org/2001/XMLSchema-instance"
xmlns:xsd="http://www.w3.org/2001/XMLSchema" version="1"
xmlns:psk="http://schemas.microsoft.com/windows/2003/08/printing/printschemakeywords">
  <psf:Feature name="psk:PageMediaSize">
    <psf:Option name="psk:NorthAmericaLetter">
      <psf:ScoredProperty name="psk:MediaSizeWIDth">
        <psf:Value xsi:type="xsd:integer">215900</psf:Value>
      </psf:ScoredProperty>
      <psf:ScoredProperty name="psk:MediaSizeHeight">
        <psf:Value xsi:type="xsd:integer">279400</psf:Value>
      </psf:ScoredProperty>
    </psf:Option>
  </psf:Feature>
  <psf:Feature name="psk:PageOrientation">
    <psf:Option name="psk:Portrait" />
  </psf:Feature>
  <psf:ParameterInit name="psk:JobCopiesAllDocuments">
    <psf:Value xsi:type="xsd:integer">1</psf:Value>
  </psf:ParameterInit>
</psf:PrintTicket>
```

FIG.7

PRINTER PROPERTY

| PAGE SETTING | FINISHING | SHEET FEEDING | PRINT QUALITY |

FAVORITE(F): ☐ STANDARD SETTING ▼

OUTPUT METHOD(M): 🖨 PRINT ▼

ADD(1)   EDIT(2)

📄 DOCUMENT SIZE(S): A4

📄→📄 OUTPUT SHEET SIZE(Z): SAME AS DOCUMENT SIZE

COPY NUMBER(C): 1 (1~9999)

DIRECTION OF PRINTING(O): Ⓐ ⦿ VERTICAL  Ⓐ ○ HORIZONTAL

PAGE LAYOUT(L): 1  1 in 1 (STANDARD)

☐ SPECIFY MAGNIFICATION(N):

MAGNIFICATION(G): 100 % (25~200)

☐ STAMP(K):

STAMP NAME(T): CONFIDENTIAL   EDIT STAMP(J)

A4 (MAGNIFICATION: AUTOMATIC)

CONFIRM SETTING(V)

USER SETTING SHEET(U)   PAGE OPTION(E)   RETURN TO STANDARD(R)

OK   CANCEL   HELP

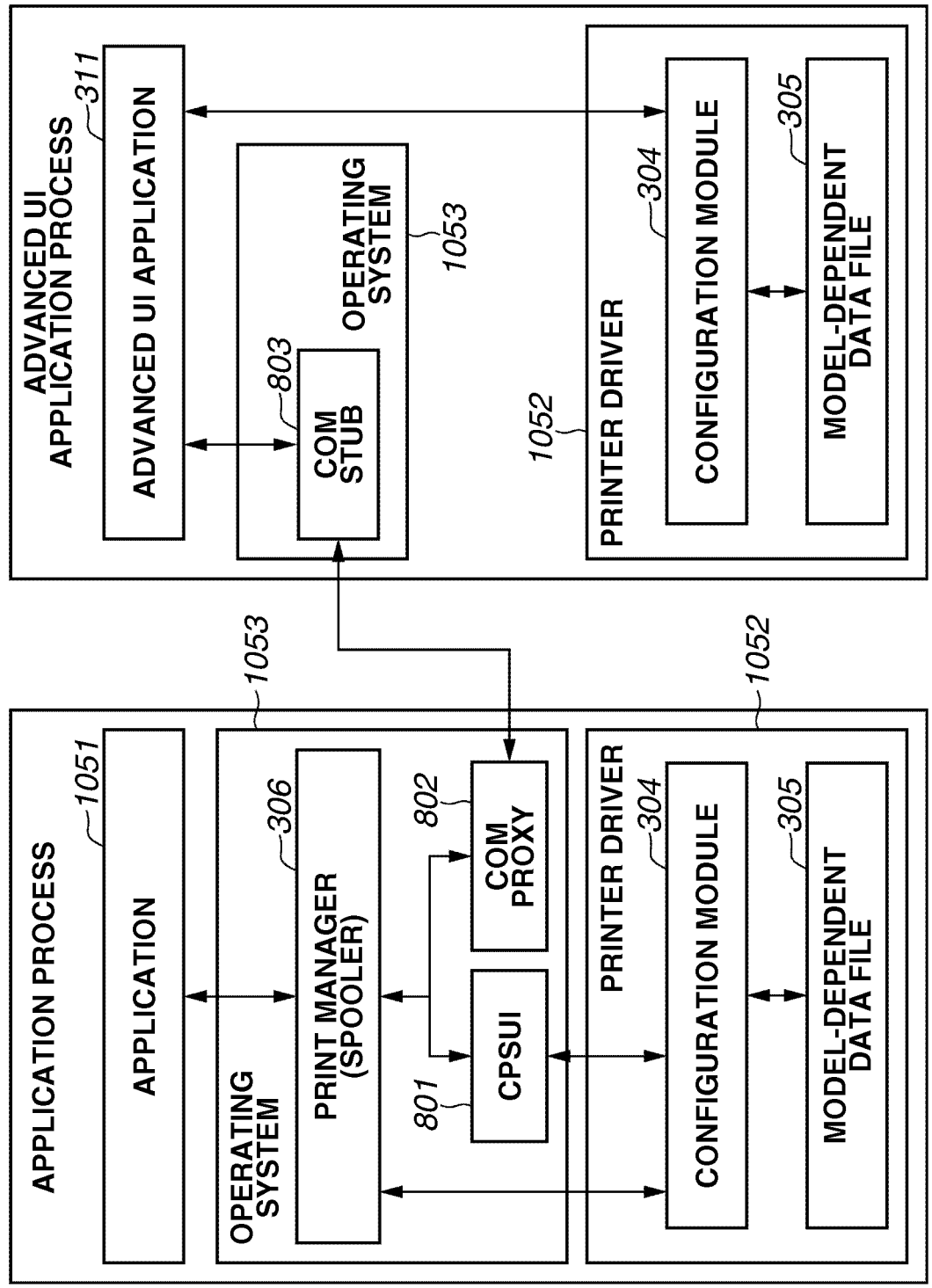

FIG.9

```
;Printer Driver Setup Information File

[Version]
ClassGUID={4D36E979-E325-11CE-BFC1-08002BE10318}
Class=Printer
DriverVer=01/01/2010,1.20.3.234

[Model]
"Printer1" = Printer1

[Printer1]
DriverFile=mxdwdrv.dll
ConfigFile=unidrvui.dll
HelpFile=unidrv.hlp
DataFile=printer1.gpd
AdvancedUICLSID={FF20716C-489F-40ad-B45A-21F4A6809E1E}
```

```
CLSID clsid = {{0xFF20716C, 0x489F, 0x40ad,{0xB4, 0x5A, 0x21, 0xF4, 0xA6,
0x80, 0x9E, 0x1E }};
::CoCreateInstance(&clsid,
                   NULL,
                   CLSCTX_LOCAL_SERVER,
                   (void **)&pPrintAdvUI );
```

(2)

```
CLSID clsid = {{0xFF20716C, 0x489F, 0x40ad,{0xB4, 0x5A, 0x21, 0xF4, 0xA6,
0x80, 0x9E, 0x1E }};
::CoRegisterClassObject(&clsid,
                        (IClassFactory*)&cf,
                        CLS_CTX_LOCAL_SERVER,
                        REGCLS_MULTIPLEUSE,
                        &dwRegister);
```

FIG.22

TEST PAGE PROPERTY

GENERAL

📇 TEST PAGE

SIZE: 66625 BYTES
PAGE: 1
DATA TYPE: RAW
PROCESSOR: winprint
OWNER: test
PRINT RECEPTION TIME: 11:18:34 2011/04/18
NOTIFY(N): [test]

PRIORITY(P)
LOW ──────▭────── HIGH
CURRENT PRIORITY: 1

SCHEDULE(S):
◉ NO TIME RESTRICTION(S)
○ START(F) [0:00 ◄▶]   END [0:00 ◄▶]

(BASIC SETTING(E))

[OK]  [CANCEL]  [APPLY(A)]  [HELP]

FIG.26

```
;Printer Driver Setup Information File

[Version]
ClassGUID={4D36E979-E325-11CE-BFC1-08002BE10318}
Class=Printer
DriverVer=01/01/2010,1.20.3.234

[Model]
"Printer1" = Printer1

[Printer1]
DriverFile=mxdwdrv.dll
ConfigFile=unidrvui.dll
HelpFile=unidrv.hlp
DataFile=printer1.gpd
AdvancedUI=prnadvui.exe
AdvancedUICLSID={FF20716C-489F-40ad-B45A-21F4A6809E1E}
```

INFORMATION PROCESSING APPARATUS, INFORMATION PROCESSING METHOD, AND STORAGE MEDIUM

CROSS-REFERENCE TO RELATED APPLICATIONS

This application is a Continuation of U.S. application Ser. No. 15/698,524, filed Sep. 7, 2017 which is a Continuation of U.S. application Ser. No. 13/459,709, filed Apr. 30, 2012, now U.S. Pat. No. 9,785,445, which claims the benefit of priority from Japanese Patent Application No. 2011-103005 filed May 2, 2011, each of which is hereby incorporated by reference herein in their entireties.

BACKGROUND OF THE INVENTION

Field of the Invention

The present invention relates to an information processing apparatus, an information processing method, and a storage medium, in which a user interface of a printer driver is activated in a different process from a process executed by an application.

Description of the Related Art

A printer driver has a dedicated user interface to perform detailed print setting. While an application displays the user interface of the printer driver via an operating system, the printer driver is loaded in a process executed by the application.

The user interface is displayed in a similar process to the process executed by the application. Therefore, intercommunication of print setting data is easy. A modal dialog for stopping an operation of the application is performed during an operation of the user interface.

The merit of executing similar processes is that the application and the printer driver can be treated as being integrated. If the user interface of the printer driver crashes because it has a defect, the application is also involved in the user interface crash because a similar process to the process executed by the application is executed.

A system for operating the printer driver and the application in different processes, which is called a sandbox, exists to cope with a problem of the similar processes. A browser having tabs, which can simultaneously browse a plurality of web pages, and operating the tabs in different processes, and an application, which is activated in a different process every time a file is opened, have been known.

Japanese Patent No. 4661939 discusses a printer driver that sets a rendering unit configured to convert drawing data of an application into a printer language in a different process, and activates an application for performing bidirectional communication with a device to sequentially monitor a status in the different process.

However, a measure to activate a user interface of the printer driver in the different process is difficult because an operating system constructs a user interface serving as a base and adds the printer driver onto the base.

Japanese Patent Application Laid-Open No. 11-143664 discusses a method for activating another service when an application calls a user interface of a printer driver, and displaying the user interface of the printer driver by the other service. Further, a method for closing a user interface of a printer driver immediately after opening the user interface as a dummy, and then activating a different process has been known.

However, the method for activating another service by the application is required to make a change for all applications to cope with this calling method. Further, the method for opening the dummy user interface is troublesome for a user because it includes an additional operation for closing the user interface once.

In addition, if the operating system provides the user interface, and the printer driver adds the user interface as a sheet later, the operating system does not correctly operate.

SUMMARY OF THE INVENTION

According to an aspect of the present invention, an information processing apparatus includes an acquisition unit configured to acquire an identifier from a setup file of a printer driver when the printer driver is installed, an addition unit configured to add the identifier acquired by the acquisition unit to driver information associated with a model of the printer driver to be installed in a database, a writing unit configured to write a path of a user interface application and the identifier into the database when the user interface application is installed, a determination unit configured to determine, when the printer driver is called from an application to display a user interface of the printer driver, whether the identifier is registered in the driver information associated with the model of the called printer driver in the database, and an activation unit configured to acquire the path of the user interface application using the identifier when the determination unit determines that the identifier is registered in the database, and activate the user interface application in a different process from an application process.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 6 illustrates an example of a print ticket having an XML format as print setting used in the XPS print processing system according to an exemplary embodiment of the present invention.

FIG. 7 illustrates a user interface of a printer driver according to an exemplary embodiment of the present invention.

FIG. 8 is a block configuration diagram at the time when the user interface operates in a process executed by an advanced UI application different from a process executed by an application according to an exemplary embodiment of the present invention.

FIG. 9 illustrates an example of a setup information file, in which a CLSID of the advanced UI application is added to the printer driver, according to an exemplary embodiment of the present invention.

FIG. 16 illustrates an example of API calling at the time when a print manager calls the advanced UI application, and an example of API calling at the time when the advanced UI application transfers an interface to the print manager according to an exemplary embodiment of the present invention.

FIG. 22 illustrates a user interface of the operating system at the time when job setting is confirmed in the printer driver including the advanced UI application according to an exemplary embodiment of the present invention.

FIG. 26 illustrates an example of a setup information file in which the advanced UI application is included in the printer driver according to an exemplary embodiment of the present invention.

DESCRIPTION OF THE EMBODIMENTS

Various exemplary embodiments, features, and aspects of the invention will be described in detail below with reference to the drawings.

Figure 1:
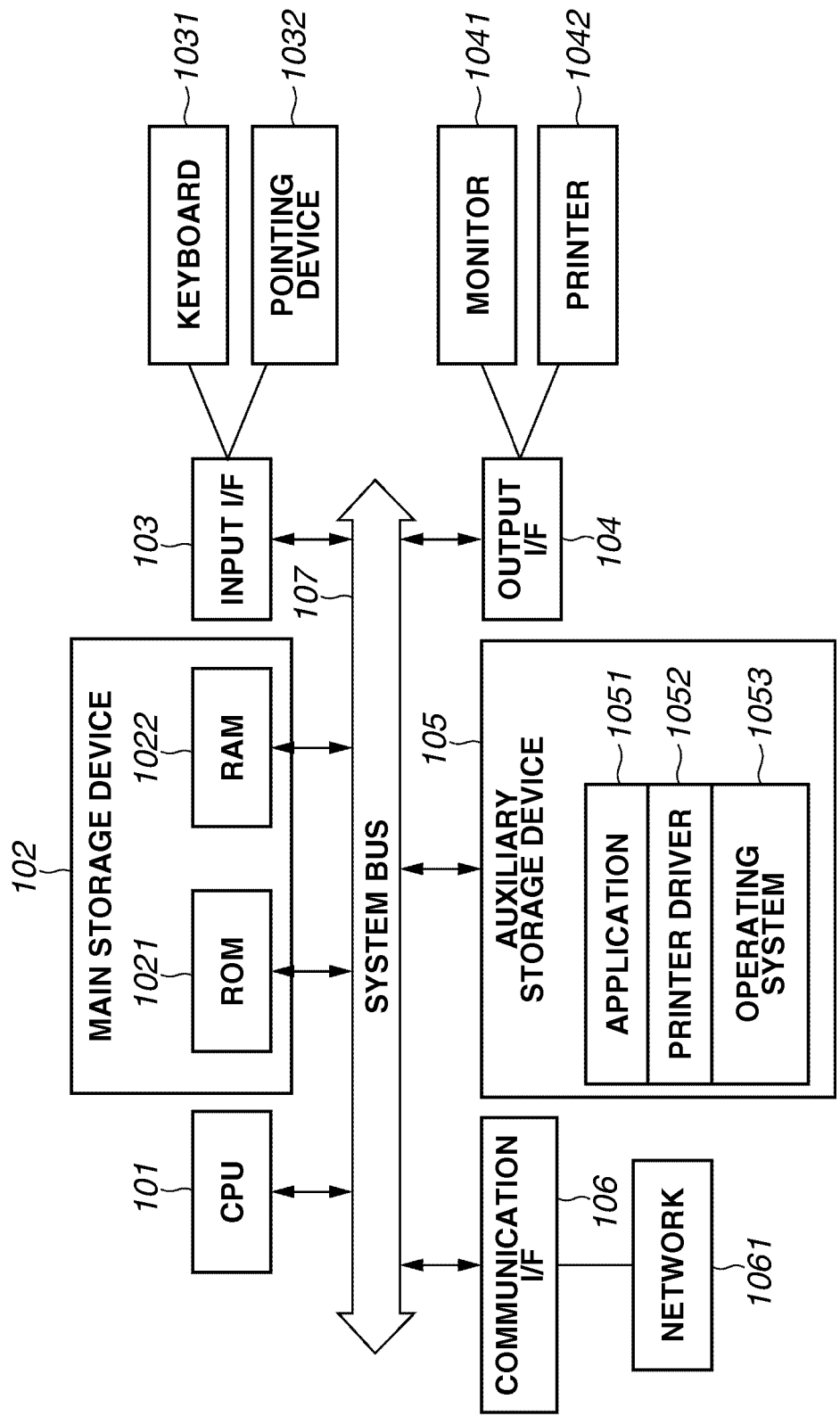
FIG. 1 is a block configuration diagram of hardware and software of a computer system according to an exemplary embodiment of the present invention.

FIG. 1 is a block configuration diagram of a system using a general computer according to an exemplary embodiment of the present invention. The present invention is applicable to a single device, a system including a plurality of devices, and a system in which a plurality of devices are connected to perform processing via a network if functions of the present invention are implemented, unless otherwise noted.

A central processing unit (CPU) 101 controls the whole system according to a program stored in a read-only memory (ROM) 1021 or a random access memory (RAM) 1022 in a main storage device 102 or an auxiliary storage device 105. The RAM 1022 is used as a work area when the CPU 105 performs various types of processing. The auxiliary storage device 105 records an operating system (OS) 1053, application software 1051, or the like.

Input devices such as a keyboard 1031 and a pointing device 1032 represented by a mouse and a touch panel are devices for a user to issue various instructions to the computer via an input interface (I/F) 103.

An output I/F 104 is an interface for outputting data to the outside, and outputs data, for example, to output devices such as a monitor 1041 and a printer 1042. The output I/F 104 may be connected to the printer 1042 via not only a local input/output (I/O) directly connected thereto but also a network 1061 connected thereto via a communication I/F 106. A common data system bus 107 exchanges data to and from modules.

Figure 2:
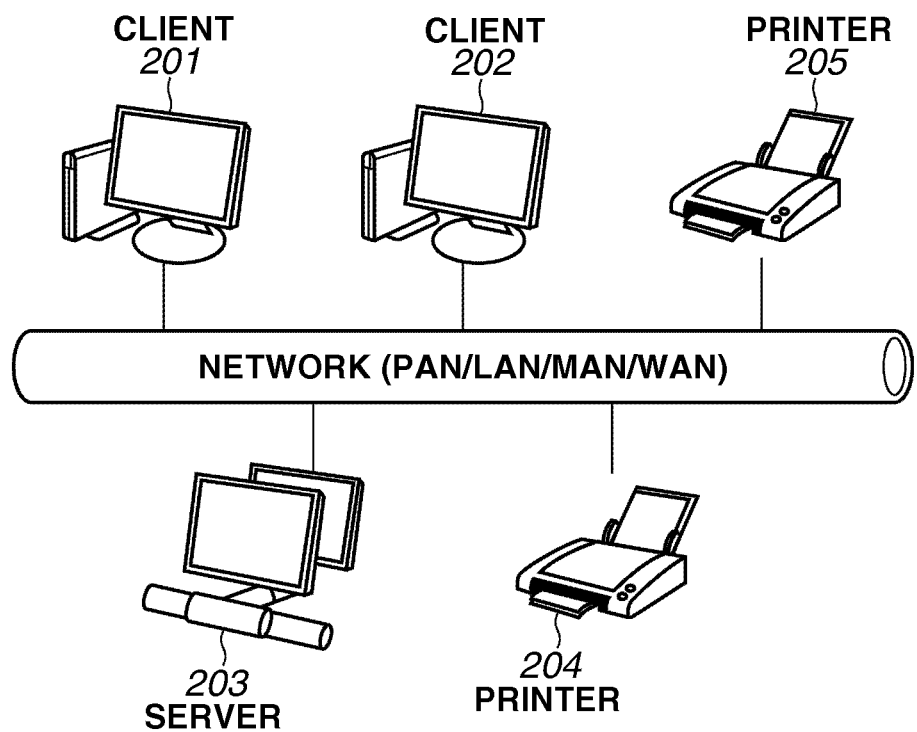
FIG. 2 illustrates a configuration of a network to which clients, a server, and printers are connected according to an exemplary embodiment of the present invention.

FIG. 2 is a simplified diagram illustrating an environment of the network 1061 according to an exemplary embodiment of the present invention. A client computer 201/202, which generates documents and images to be printed, is connected to a single network or a plurality of networks.

A server computer 203, which manages a user of the client computer 201/202 and a printer 204/205, may be connected to the network or networks. The printer 205, for example, may be in an offline state where it cannot be actually used even if the printer 204/205 may be physically connected to the single network or the plurality of networks.

The network includes small-scale to large-scale networks such as a personal area network (PAN), a local area network (LAN), a metropolitan area network (MAN), and a wide area network (WAN). The devices are connected to all the networks. Servers and printers may be connected over the Internet, which is referred to as cloud computing.

Figure 3:
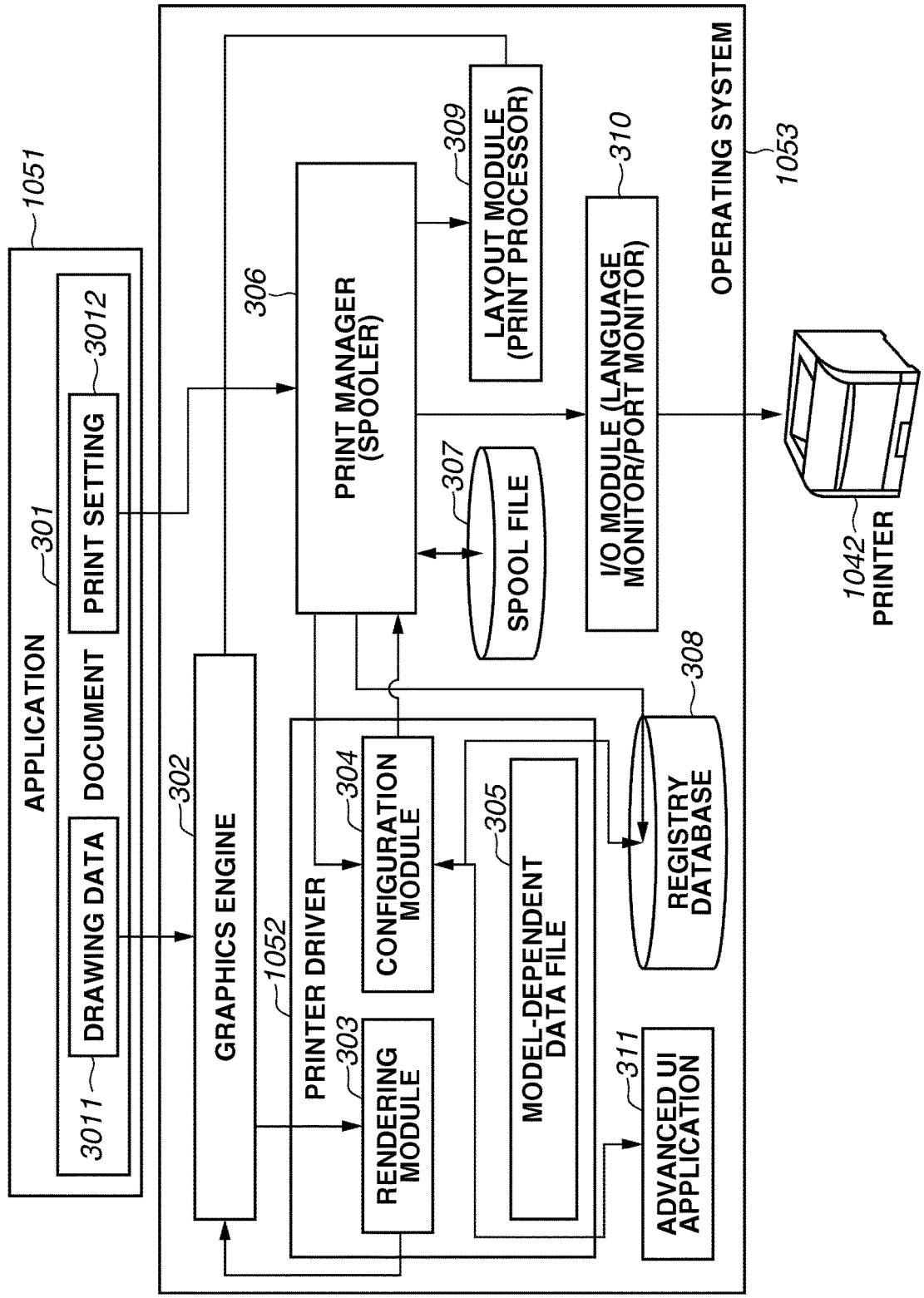
FIG. 3 is a block configuration diagram of a print processing system using a general computer according to an exemplary embodiment of the present invention.

FIG. 3 illustrates a print processing system using a general computer. An application 1051, a printer driver 1052, and an operating system 1053 are stored in the auxiliary storage device 105 illustrated in FIG. 1.

A graphic engine 302 and a print manager 306 are modules included in the operating system 1053. The user uses the input devices such as the keyboard 1031 and the mouse 1032, to perform print processing for a document 301 generated using the application 1051 displayed on the monitor 1041 in the output device. The print processing is performed by performing three types of processing, i.e., selection of the printer 1042, generation of print setting 3012, and conversion of drawing data 3011 in this order.

First, the printer driver 1052 corresponding to a printer 1042, which performs printing, is selected as the selection of the printer. The print setting 3012 in the document 301 is then generated. A configuration module 304 in the printer driver 1052 generates an initial value of the print setting 3012.

The generated print setting 3012 is changed and set so that a final printing result desired by the user is obtained using a user interface of the application 1051 or the printer driver 1052. For example, the size of a sheet to be output is changed and two-sided printing or monochrome printing is performed.

Either one of the configuration module 304 and an advanced user interface (UI) application 311 provides the user interface of the printer driver 1052.

While the print setting 3012 is held on the RAM 1022, a storing format is a binary data structure or a markup language such as an extensible markup language (XML). This format differs depending on specifications of the printer driver 1052 and the operating system 1053.

The print setting 3012 is generated for each document printing. However, the printer driver 1052 stores a configuration of an optional device for the printer 1042 and an environmental setting for each user, which are desired to be retained, in a registry database 308 in the operating system 1053.

The print manager 306 in the operating system 1053 stores a default value for each user of the print setting 3012 in the registry database 308. Finally, drawing data 3011 is converted.

When the generation of the print setting 3012 ends, the user notifies the operating system 1053 of print processing to perform the print processing. The operating system 1053 performs drawing on the specified printer driver 1052 via the graphics engine 302.

If layout processing is specified by the print setting 3012, a spool file 307 is temporarily generated before reaching a rendering module 303 in the printer driver 1052, and a layout module 309 is activated.

"Layout processing" means processing for replacing the order of sheets and arranging a plurality of pages on one sheet. The layout module 309 changes a layout, and then performs drawing on the printer driver 1052 again.

The rendering module 303 in the printer driver 1052, to which the drawing data has been sent, converts the drawing data into a data language, i.e., a printer control language, which can be understood by the printer 1042. At this time, the print setting 3012 is also converted into the printer control language.

Both the rendering module 303 and the configuration module 304 may be a common module for a plurality of types of printers 1042. A difference for each model is described in a model-dependent data file 305. The rendering module 303 and the configuration module 304 refer to the model-dependent data file 305, as needed.

Converted data is sequentially stored as the spool file 307. The print manager 306 acquires the spool file 307 to perform schedule management for the print processing as a print job file.

If the printer 1042 enters a printable state, the print manager 306 sends print job data to the printer 1042 via an I/O module 310. Thus, print data from the application 1051 is converted into a printer language, to perform printing.

Figure 5:
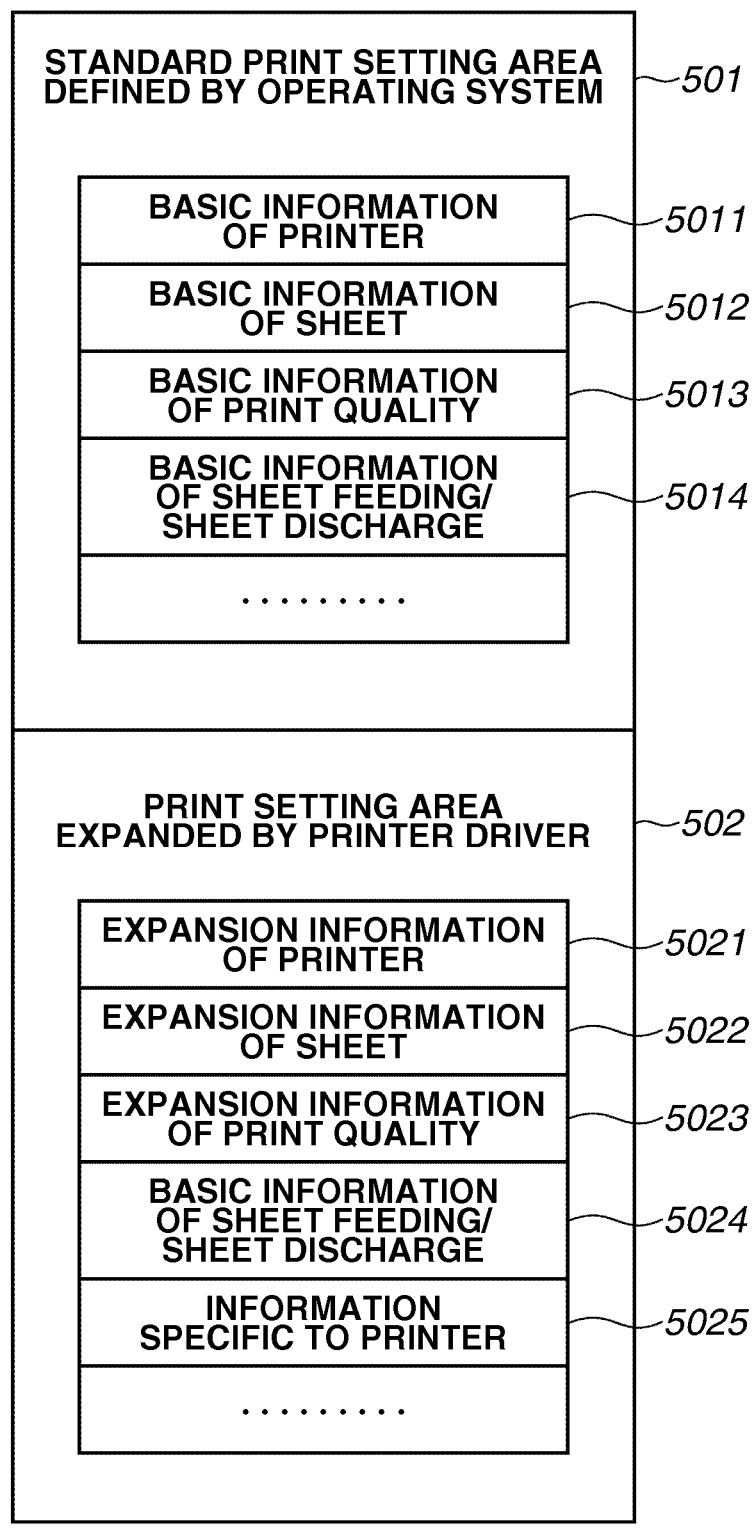
FIG. 5 is a block configuration diagram illustrating a data structure of a device module (DEVMODE) structure as print setting according to an exemplary embodiment of the present invention.

To generate the print setting 3012 in the document 301, the application 1051 directly rewrites the print setting 3012 or uses a user interface illustrated in FIG. 7 provided by the configuration module 304 in the printer driver 1052 or the advanced UI application 311. The print setting 3012 has a structure illustrated in FIG. 5, which is called a DEVMODE structure, in a Microsoft (registered trademark) Windows (registered trademark) operating system.

The DEVMODE structure is divided into a standard print setting area 501 opened and defined by the operating system 1053 and a print setting area 502 expanded by the printer driver 1052. The standard print setting area 501 includes values of basic print setting such as switching of a sheet size and a sheet feed stage and color/monochrome switching.

The expanded print setting area 502 includes values of a sheet discharge function corresponding to a printer option and a fine color tone adjustment function. The application 1051 cannot know expansion setting of each printer driver 1052. Therefore, the application 1051 can directly rewrite the print setting 3012 in only the standard print setting area 501 defined in the system.

Therefore, the application 1051 generally displays the user interface of the printer driver 1052, to cause the user to perform the print setting 3012 in the expanded print setting area 502.

The configuration module 304 provides not only the user interface but also an application programming interface (API). Thus, the expanded print setting area 502 can also be set from the outside without displaying the user interface.

If the API provided by the configuration module 304 is used, the application 1051 is required to correspond to the API for each printer driver 1052. Therefore, the general application 1051 changes only the standard print setting area 501.

Figure 4:
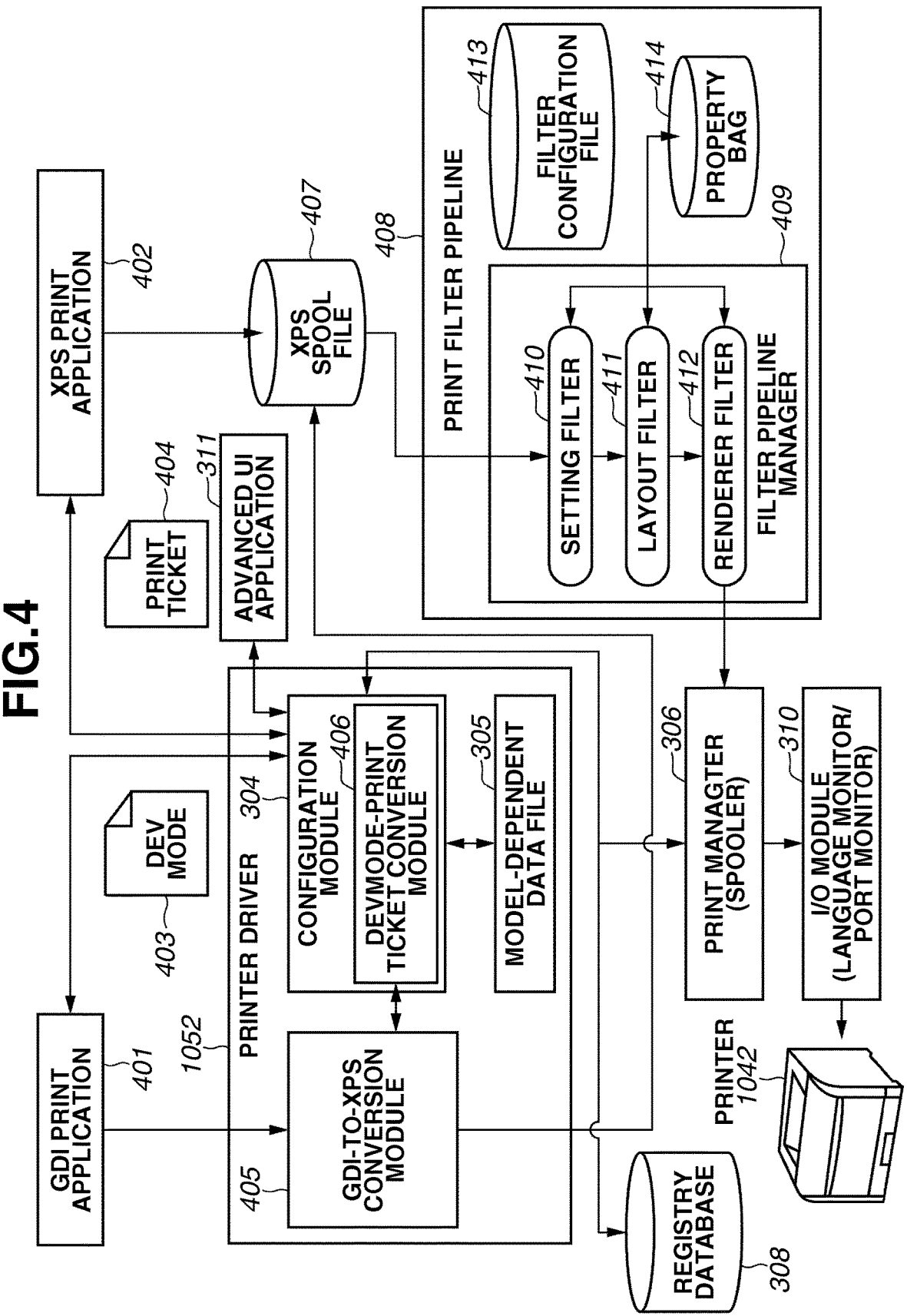
FIG. 4 is a block configuration diagram of an XPS print processing system according to an exemplary embodiment of the present invention.

Another printing system according to the exemplary embodiment of the present invention will be described. While the print processing system illustrated in FIG. 3 is referred to as a graphic device interface (GDI) printing system, FIG. 4 is a block configuration diagram of an XML paper specification (XPS) printing system.

The XPS printing system is a system for performing printing using a document file format called XML Paper Specification as spool data. The XPS printing system is also operating on the operating system 1053, similar to the GDI printing system.

The print manager 306, a GDI-to-XPS conversion modules 405, and a filter pipeline manager 409 are modules included in the operating system 1053.

The printer driver 1052 and filters in the filter pipeline manager 409 are stored as the printer drivers 1052 in the auxiliary storage device 105 illustrated in FIG. 1. While the filter pipeline manager 409 is included in the operating system 1053, each of the filters is a module in the printer driver 1052.

A GDI print application program (hereinafter abbreviated as "GDI application") 401 and an XPS print application program (hereinafter abbreviated as "XPS application") 402 are stored as the application 1051 in the auxiliary storage device 105 illustrated in FIG. 1.

The user uses the input devices such as the keyboard 1031 and the mouse 1032, to perform print processing from the GDI application 401 reflected on the monitor 1041 serving as the output device and the XPS application 402. The print processing is performed by performing three types of processing, i.e., selection of the printer 1042, generation of the print setting 3012, and conversion of the drawing data 3011 in this order.

First, the printer 1042, which is to perform printing, is selected. This is synonymous with selecting the printer driver 1052 corresponding to the printer 1042 that performs printing. The print setting 3012 is then generated.

The print setting 3012 is performed in such a manner that the application 1051 ensures a memory for the print setting 3012 and the application 1051 or the configuration module 304 in the printer driver 1052 fill setting data using the model-dependent file 305.

A binary DEVMODE structure 403 is used as print setting data in the GDI application 401, and a print ticket 404 described in the XML is used in the XPS application 402. Each of the DEVMODE structure 403 and the print ticket 404 has a standard area defined by the operating system 1053 and an expanded area uniquely defined by the printer driver 1052, like in a configuration illustrated in FIG. 5.

The print ticket 404 is print setting information described in an XLM format illustrated in FIG. 6. Therefore, the standard area and the expanded area are separately described by name spaces. The DEVMODE structure 403 or the print ticket 404 retains the print setting 3012, and the application 1051 directly rewrites the print setting 3012, to change the print setting 3012.

A dedicated setting dependent on the printer 1042 is performed by displaying the user interface (see FIG. 7) of the configuration module 304 in the printer driver 1052 or the advanced UI application 311.

The printer driver 1052 changes setting, which is dependent on the printer 1042, of the DEVMODE structure 403 or the print ticket 404 according to setting of the user interface. "Print setting" specifically means data required to perform printing, e.g., setting the size of a sheet to be output to "A4", performing two-sided printing, performing color/monochrome switching, and specifying a sheet feed stage.

Since, in the print ticket 404, the print setting 3012 is written in an XML format, the XPS application 402 can easily directly change and rewrite all setting values. However, the print setting 3012 may be changed using the user interface of the printer driver 1052, as is conventionally done.

The print setting 3012 is generated every time document printing is performed. The user interface stores an optional device of the printer 1042 and an environmental setting for each user, which is to be retained, in the registry database 308 in the operating system 1053. The print manager 306 in the operating system 1053 stores a default value for each user of the print setting 3012 in the registry database 308. Finally, the drawing data 3011 is converted.

If the print setting 3012 is finalized, the user performs print processing from the application 1051. If printing is performed from the GDI application 401, the drawing data 3011 is sent to the GDI-to-XPS conversion module 405 taking the form of the printer driver 1052, so that an XPS spool file 407 is generated.

At this time, the GDI-to-XPS conversion module 405 calls the configuration module 304, and converts the print setting 3012 from the DEVMODE structure 403 to the print ticket 404. If printing is performed from the XPS application 402, there are two types of methods. More specifically, the XPS application 402 itself generates an XPS file, and the operating system 1053 generates an XPS file according to a drawing instruction from the XPS application 402.

The XPS spool file 407 is generated during printing whichever of the methods is used. Thus, the XPS printing system always generates the XPS spool file 407 during printing.

If the XPS spool file 407 is generated, the processing is transferred to a print filter pipeline process. The print filter pipeline process is a mechanism to perform printing by using a plurality of filters. The filter configuration file 413 controls the number and the order of filters.

The filter pipeline manager 409, which operates in the print filter pipeline process, performs processing using a setting filter 410, a layout filter 411, and a renderer filter 412 in this order in the present exemplary embodiment according to the filter configuration file 413.

The filters differ in number and type depending on a configuration of the printer driver 1052. The print processing is performed by transferring the XPS spool file 407 to the filters, and progresses when each of the filters processes the XPS spool file 407 and transfers the processed XPS spool file 407 to the subsequent filter. Finally, the XPS spool file 407 is output in a printer control language serving as a data language that can be understood by the printer (hereinafter abbreviated as a page description language (PDL)).

If the printer 1042 is an XPS direct printer capable of directly reading and printing the XPS spool file 407, the XPS spool file 407 may be printed without passing through all the filters.

The setting filter 410 performs processing for reading the print ticket 404 and writing data required for printing into the print ticket 404. The layout filter 411 performs processing relating to a layout, e.g., a change in magnification and an imposition layout and a stamp for bookbinding. The layout filter 411 operates according to the print ticket 404 serving as print setting data included in the XPS spool file 407.

When an imposition setting does not exist in the print ticket 404, for example, the layout filter 411 does not operate so that the XPS spool file 407 is directly transferred to the subsequent filter without passing therethrough.

The last renderer filter 412 renders the XPS spool file 407, and converts the rendered XPS spool file 407 into PDL data. The print manager 306, which manages a schedule for print processing, manages the PDL data. PDL data are registered as print jobs in a queue one after another.

If the printer 1042 enters a printable state, the PDL data are sent via the I/O module 310 in the order registered in the queue. A main role of the printer driver 1052 is to convert the print data from the application 1051 into a printer language. Print processing is thus performed.

Figure 10:
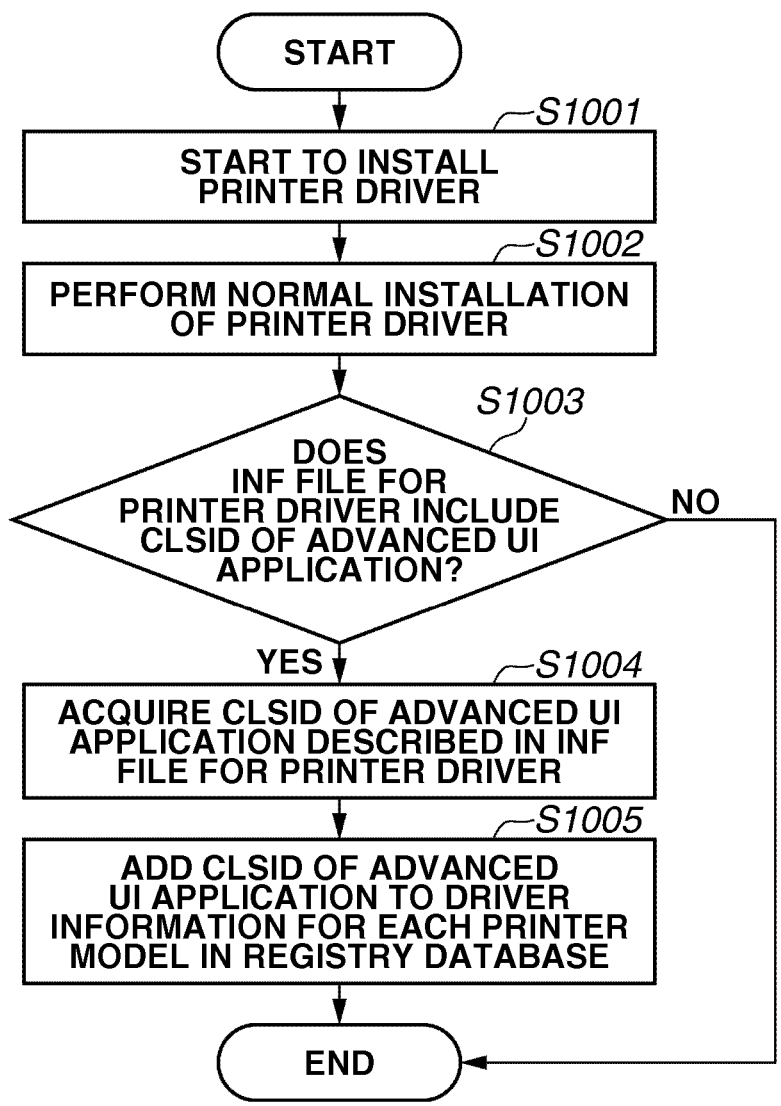
FIG. 10 is a flowchart at the time when an operating system installs the printer driver according to an exemplary embodiment of the present invention.

Association between the printer driver 1052 and the advanced UI application 311 will be described below. First, installation of the printer driver 1052 will be described according to a flowchart of FIG. 10.

The printer driver 1052 is installed into the operating system 1053 according to a setup information file (hereinafter referred to as an INF file) illustrated in FIG. 9. The INF file contains information required to install the printer driver 1052, e.g., a model name of the printer 1042, files to operate the printer driver 1052, and a version of the printer 1042.

The INF file and the various files composing the printer driver 1052 are collected into one installation set for the printer driver 1052.

In step S1001, when the install of the printer driver 1052 is started, the operating system 1053 searches for an installation set for the printer driver 1052 in a specified model. While the installation set includes one that is incorporated in the operating system 1053, it may be specified by a user, or may be provided from a previously identified distribution server or the like.

In step S1002, the operating system 1053 copies a file based on the INF file included in the installation set, and writes required driver information into the registry database 308, to complete normal installation of the printer driver 1052.

In step S1003, the operating system 1053 confirms whether the INF file includes a class identifier (CLSID) of the advanced UI application 311. "CLSID" is one type of universally unique identifier (UUID), is represented by a 16-byte numerical value, and is unique in the world. As the CLSID, a CLSID assigned to the advanced UI application 311 to be used is described in the INF file, to identify the advanced UI application 311.

In FIG. 9, a key AdvancedUICLSID corresponds to the CLSID of the advanced UI application 311. If the CLSID of the advanced UI application 311 exists (YES in step 1003), the processing proceeds to step S1004. In step S1004, the operating system 1053 acquires the CLSID from the INF file.

In step S1005, the operating system 1053 adds the CLSID of the advanced UI application 311 to the driver information corresponding to printer model in the registry database 308. The installation of the printer driver 1052 is thus completed.

Figure 11:
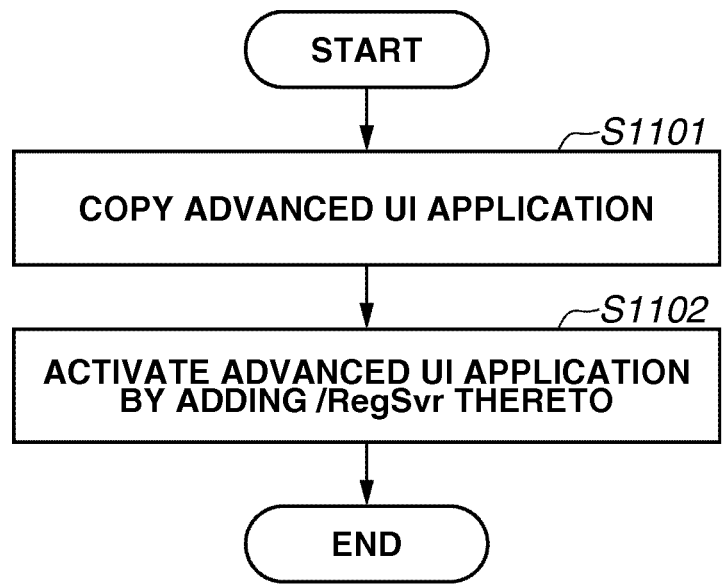
FIG. 11 is a flowchart at the time when an installer for the advanced UI application installs the advanced UI application according to an exemplary embodiment of the present invention.
Figure 15:
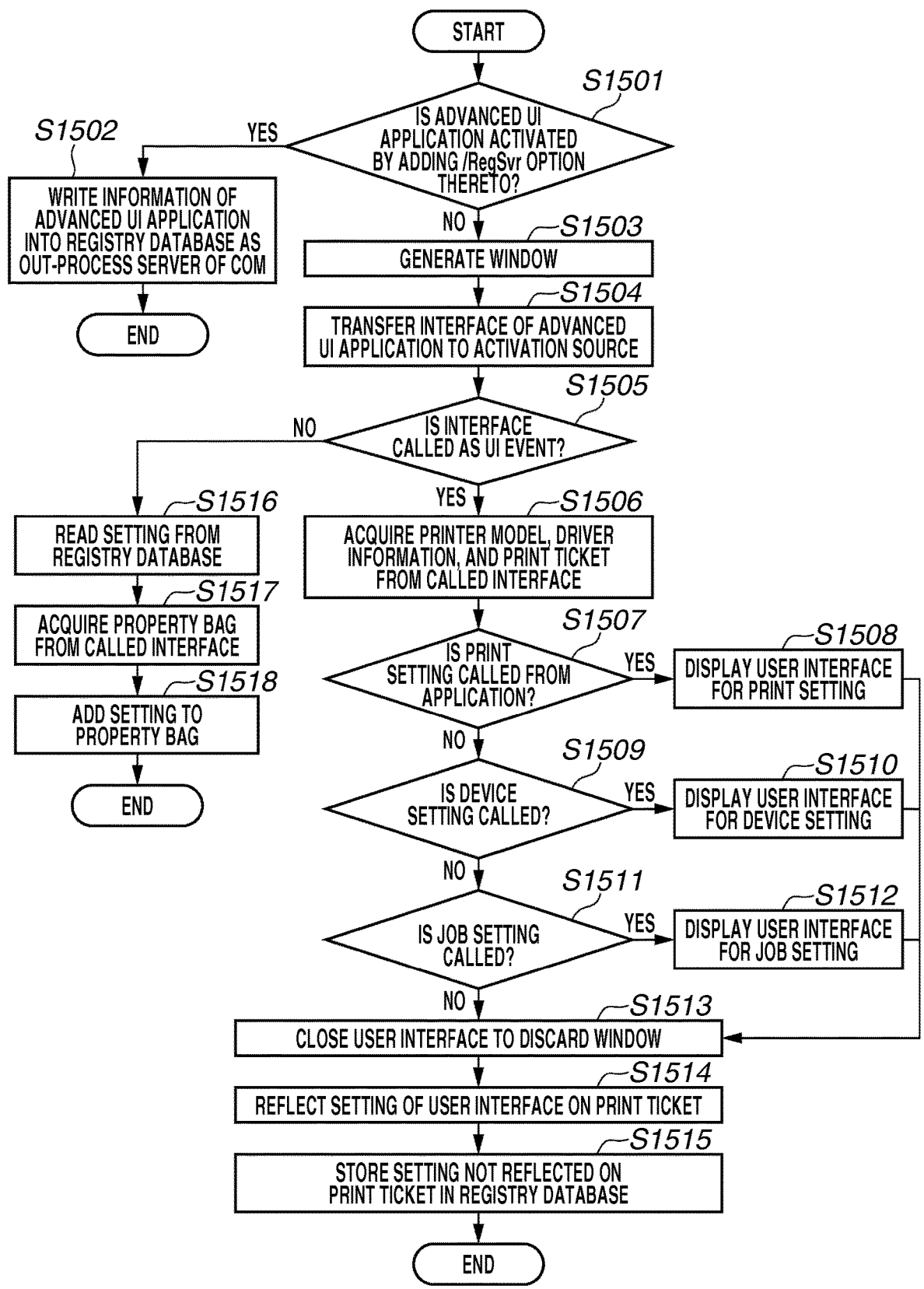
FIG. 15 is a flowchart at the time when the advanced UI application operates according to an exemplary embodiment of the present invention.

Installation of the advanced UI application 311 will be described below with reference to a flowchart of FIG. 11 and a part of a flowchart of FIG. 15.

An installation set for the advanced UI application 311 including an installer and files composing the advanced UI application 311 exists separately from the installation set for the printer driver 1052.

If the user starts the installer, the processing proceeds to step S1101. In step S1101, the installer first copies the files composing the advanced UI application 311 in a folder storing the application 1051 specified by the user. In step S1102, the installer then activates the advanced UI application 311 by adding a /RegSvr option thereto as an argument.

In step S1501, the activated advanced UI application 311 determines whether the /RegSvr option is added thereto. If the /RegSvr option is added to the advanced UI application 311 (YES in step S1501), the processing proceeds to step S1052. In step S1052, the advanced UI application 311 writes information into the registry database 308 as an out-process server of a component object model (COM).

"COM" is a communication technique between software components proposed by Microsoft Corporation. Each of the software components, between which communication is performed, is identified by a unique CLSID. "Out-process server" is a component that operates in a different process from a called process. It is clearly specified that the advanced UI application 311 is the out-process server.

Information written into the registry database 308 includes a full path including an application name, the CLSID of the advanced UI application 311, and a character string "LocalServer32" indicating that the advanced UI application 311 is the out-process server. The CLSID is required to be same to the CLSID specified by the INF file illustrated in FIG. 9. The installation of the advanced UI application 311 is thus completed.

Since the CLSID acquired by the installation of the printer driver 1052 and the CLSID described by the installation of the advanced UI application 311 are similar, the operating system 1053 can associate both the CLSIDs with each other.

Figure 12:
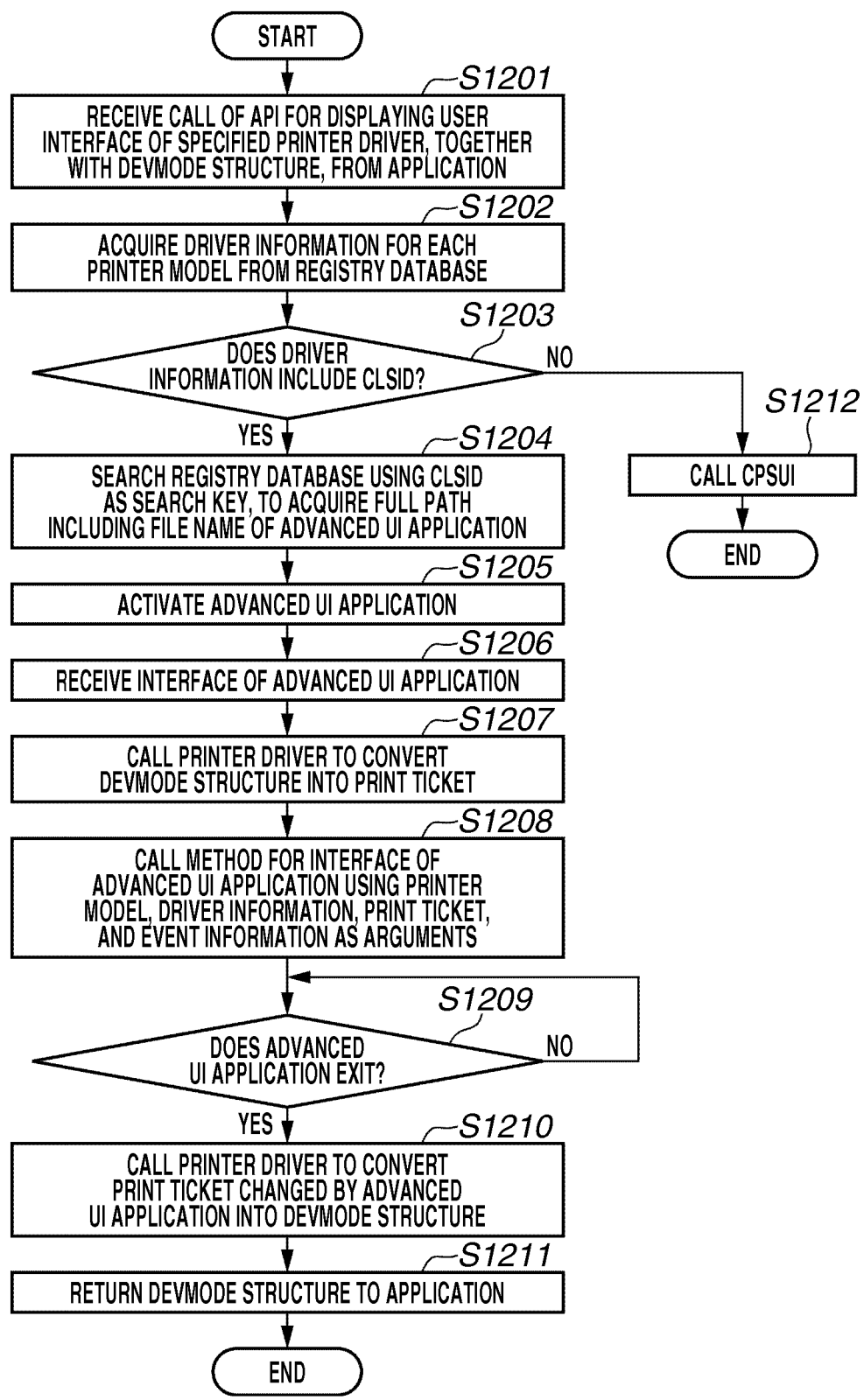
FIG. 12 is a flowchart at the time when the operating system opens the user interface of the printer driver according to an exemplary embodiment of the present invention.

The flow of display of the user interface of the printer driver 1052 from the application 1051 will be described below with reference to a block configuration diagram of FIG. 8 and flowcharts of FIGS. 12 and 15.

In step S1201, the print manager 306 serving as a module in the operating system 1053 receives a call of (from) the API for displaying the user interface of the printer driver 1052 from the application 1051. At that time, the print manager 306 also receives the DEVMODE structure 403 serving as print setting data as an argument from the application 1051.

The current print setting 3012 can be viewed by a user by constructing the user interface according to the received DEVMODE structure serving as print setting data.

The print manager 306 also receives model information for specifying which of the printer drivers 1052 is to be used from the application 1051. This is for clarifying, when a plurality of printer drivers 1052 is installed in the operating system 1053, which of the printer drivers 1052 is to be used.

The print manager 306 searches the registry database 308 based on the model information received from the application 1051. The driver information described during installation of the printer driver 1052 is written into the registry database 308. In step S1202, the print manager 306 acquires the driver information corresponding to the received model information.

In step S1203, the print manager 306 determines whether the acquired driver information includes the CLSID of the advanced UI application 311. If the CLSID of the advanced UI application 311 does not exist (NO in step S1203), the processing proceeds to step S1212. In step S1212, the print manager 306 calls the CPSUI 801 to open the user interface of the configuration module 304 in the printer driver 1052.

A common property sheet user interface (CPSUI) 801 generates a base of a property sheet, and requests the configuration module 304 to generate the user interface.

The configuration module 304 uses the model-dependent data file 305, to display a user interface corresponding to the printer model. More specifically, the configuration module 304 activates the user interface module in a similar process to a process executed by the application 1051.

If the CLSID of the advanced UI application 311 exists (YES in step S1203), the processing proceeds to step S1204. In step S1204, the print manager 306 specifies the CLSID and activation by the out-process server as arguments, to call the API of the operating system 1053 (see FIG. 16 (1)).

The print manager 306 searches the registry database 308 using the specified CLSID as a search key within the API of the operating system 1053.

If the advanced UI application 311 has already been installed (YES in step S1203), the processing proceeds to step S1204. In step S1204, the print manager 306 can acquire a full path including a file name of the advanced UI application 311 from the registry database 308 within the API of the operating system 1053.

If the advanced UI application 311 has not been installed (NO in step S1203), the processing proceeds to step S1212. In step S1212, the print manager 306 displays the user interface of the printer driver 1052, like when the CLSID does not exist. This occurs in an environment where the advanced UI application 311 has not been installed, although the INF file includes the CLSID.

In step S1205, the print manager 306 activates the advanced UI application 311 in a process different from the process executed by the application 1051 within the API of the operating system 1053 if it acquires the full path. If the /RegSvr option is not added to the activated advanced UI application 311 (NO in step S1501), the processing proceeds to step S1503. In step S1503, the advanced UI application 311 generates a window.

The window generated at this time point has not been displayed yet, and is generated only to wait for response from the print manager 306 in a message loop.

In step S1504, the advanced UI application 311 generates an interface object of the advanced UI application 311, and specifies the interface object as an argument, to call the API of the operating system 1053 (FIG. 16 (2)).

In step S1206, the print manager 306 can receive an interface of the advanced UI application 311. In step S1207, the print manager 306, which has received the interface, converts the DEVMODE structure 403 into the print ticket 404.

The print manager 306 calls the configuration module 304, to convert the configuration module 304 into the print ticket 404. In binary data like the DEVMODE structure 403, it is disadvantageous to send and receive data between different processes so that it is converted into the print ticket 404 written in an XML having a text format.

In step S1208, the print manager 306 calls a method for the received interface using the printer model, the driver information acquired based on the CLSID, the print ticket 404, and event information as arguments of the received interface. "Event information" is information indicating how user interface is to be displayed for the printer driver 1052 by the application 1051.

The number of user interfaces of the printer driver 1052 is not one (so the printer driver 1052 may have a plurality of user interfaces). There exist a user interface for performing print setting, a user interface for performing device setting and a user interface for confirming job print setting. Which of the user interfaces is to be displayed is required to be notified to the advanced UI application 311 as the event information.

In step S1505, the advanced UI application 311 receives the call of the interface to determine whether it is a UI event. If it is determined to be the UI event (YES in step S1505), the processing proceeds to step S1506. In step S1506, the advanced UI application 311 acquires the printer model, the driver information, and the print ticket 404 from the called interface.

The advanced UI application 311 then determines the type of the UI event, and determines the user interface to be displayed. In step S1507, the advanced UI application 311 determines whether the user interface for print setting is called from the application 1051. If the user interface for print setting is called from the application 1051 (YES in step S1507), the processing proceeds to step S1508. In step S1508, the advanced UI application 311 displays the user interface for print setting.

In step S1509, the advanced UI application 311 determines whether the user interface for device setting is called. If the user interface for device setting is called (YES in step S1509), the processing proceeds to step S1510. In step S1510, the advanced UI application 311 displays the user interface for device setting.

In step S1511, the advanced UI application 311 calls the user interface for job setting. If the user interface for job setting is called (YES in step S1511), the processing proceeds to step S1512. In step S1512, the advanced UI application 311 displays the user interface for job setting.

The advanced UI application 311 also displays the user interface based on the acquired printer model, driver information, and print ticket 404. The advanced UI application 311 calls the printer driver 1052, to acquire and control data for print setting items used for display and logic such as prohibitions between the setting items.

The advanced UI application 311 can also display the user interface of the configuration module 304 in the printer driver 1052. However, the advanced UI application 311 itself can display the user interface, to eliminate the user interface from the configuration module 304.

Thus, the configuration module 304 in the printer driver 1052 can be only the print setting 3012. The user interface can be freely changed without updating the printer driver 1052.

The advanced UI application 311 can receive a driver interface via which the printer driver 1052 is to be called instead of directly calling the printer driver 1052.

The advanced UI application 311 can also set the print setting items and prohibitions between the setting items via the driver interface.

In step S1513, the advanced UI application 311 closes the user interface, to discard the window if the user finishes performing the print setting 3012 using the user interface. In step S1514, the advanced UI application 311 reflects the setting of the user interface on the print ticket 404 transferred from the interface. In step S1515, the advanced UI application 311 stores data, which cannot be reflected on the print ticket 404, in the registry database 308.

The data that cannot be reflected on the print ticket 404 includes a configuration of an optional device such as a finisher in a printer, private information such as a user name and a password, and functions generated by the user, e.g., favorites and stamps.

If all the data have been stored, the advanced UI application 311 is finished, to return control to the print manager 306 serving as a calling source.

In step S1209, the print manager 306 waits until the advanced UI application 311 ends while displaying the user interface. If it can be confirmed that the advanced UI application 311 ends (YES in step S1209), the print manager 306 receives the print ticket 404 that has been changed by the advanced UI application 311, and then, the processing proceeds to step S1210.

In step S1210, the print manager 306 calls the configuration module 304 in the printer driver 1052 to convert the print ticket 404 into the DEVMODE structure 403. In step S1211, the print manager 306 returns the DEVMODE structure 403 obtained by the conversion to the application 1051, to end the API. Thus, the user interface associated with the print setting 3012 is performed in a different process from the process executed by the application 1051.

Figure 13:
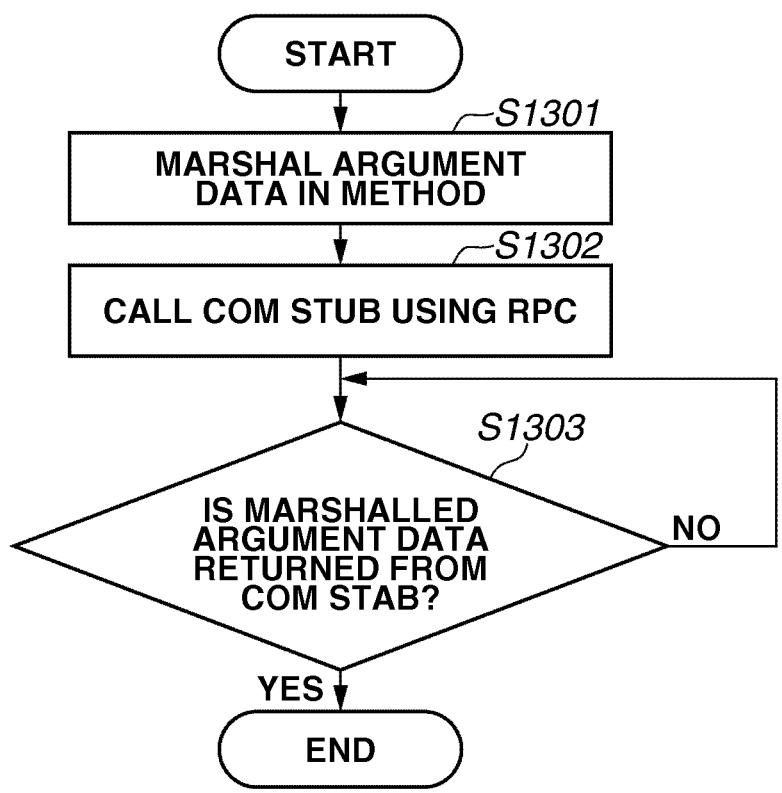
FIG. 13 is a flowchart at the time when a COM proxy calls a COM stub to perform inter-process communication according to an exemplary embodiment of the present invention.
Figure 14:
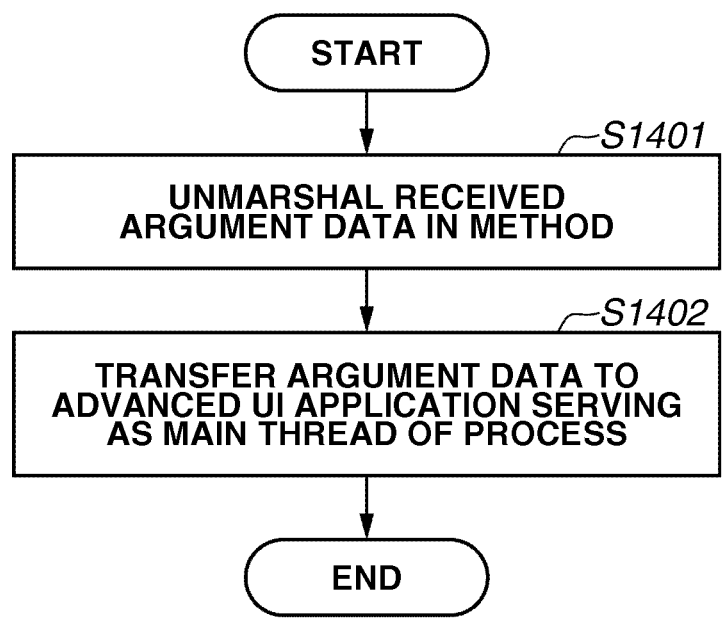
FIG. 14 is a flowchart at the time when a COM proxy calls a COM stub to perform inter-process communication according to an exemplary embodiment of the present invention.

While the method for the interface is called between the process executed by the application 1051 and a process executed by the advanced UI application 311, its content will be described referring to the block configuration diagram of FIG. 8 and flowcharts of FIGS. 13 and 14.

If the method for the interface is called, the operating system 1053 calls the COM proxy 802. In step S1301, the COM proxy 802 performs marshaling of argument data input to the method for the interface.

"Marshaling" means storing object data in a stream so that data can be sent and received between different two systems. In step S1302, the COM proxy 802 uses a remote procedure call (RPC) to call the COM stub 803 in the process of the advanced UI application 311.

"RPC" means a function of calling a procedure between separate systems. The COM proxy 802 sends marshaled stream data to the called COM stub 803. In step S1401, the COM stub 803 performs unmarshaling of the stream data received from the COM proxy 802, to return the unmarshalled stream data to the argument data in the method serving as original object data.

"Unmarshaling" means returning stream data to original object data. In step S1402, the COM stub 803 transfers the argument data in the method to the advanced UI application 311 serving as a main thread of the process.

Thus, the print manager 306 activates the advanced UI application 311 in a different process, to send data. On the other hand, when data is sent from the advanced UI application 311 to the print manager 306, the COM proxy 802 serves as a COM stub, and the COM stub 803 serves as a COM proxy. Therefore, the COM proxy and the COM stub are respectively similar modules having similar functions.

The advanced UI application 311 operates in a different process from the process executed by the application 1051. Therefore, information can only transmitted using via the interface by using the print ticket 404 serving as print setting data.

The data stored in the registry database 308, which is not included in the print ticket 404, cannot be referred to during printing. Therefore, all data cannot be sent to the printer 1042.

Figure 17:
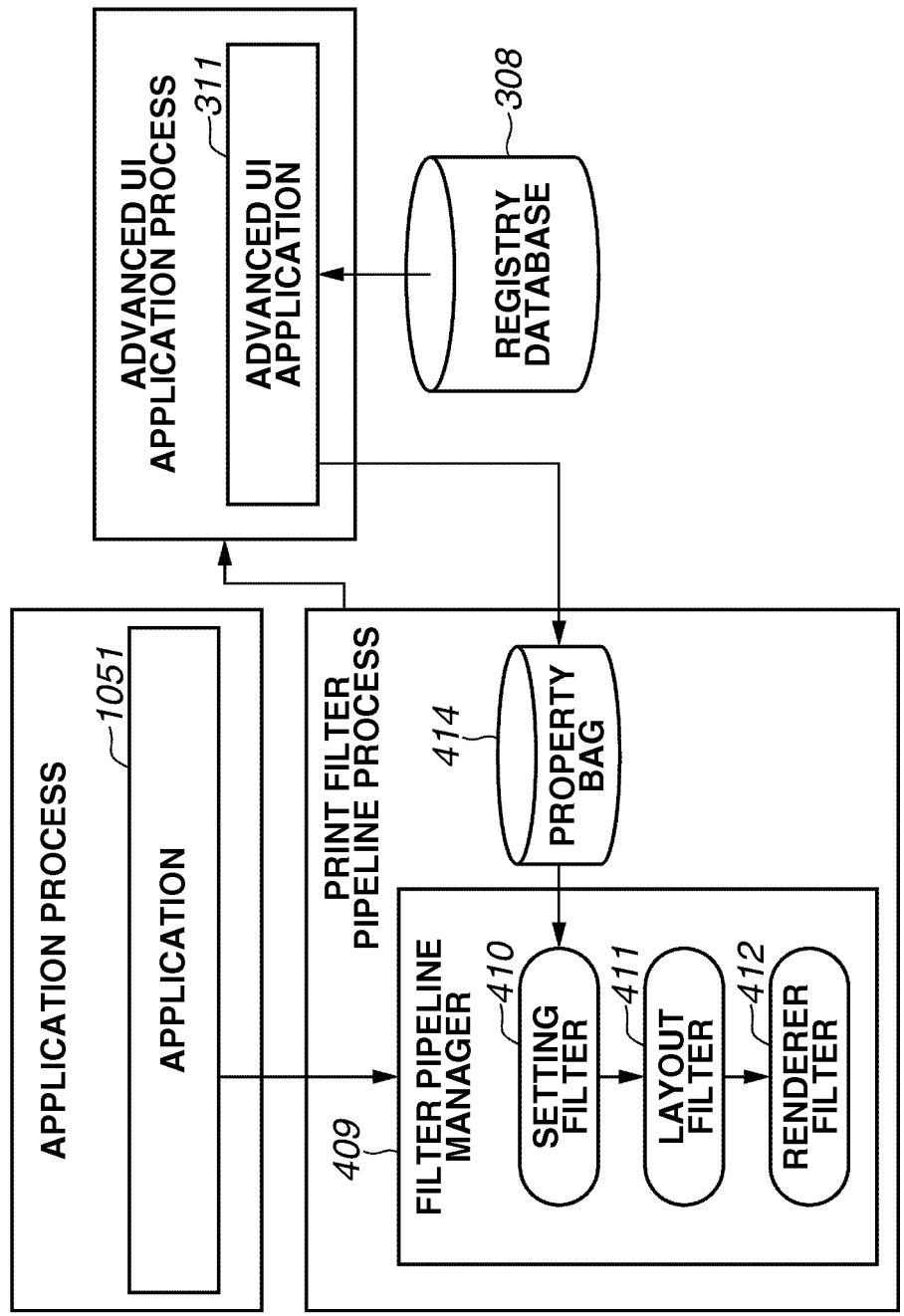
FIG. 17 is a block configuration diagram at the time when the advanced UI application transfers data to a filter pipeline manager in an XPS printing system according to an exemplary embodiment of the present invention.
Figure 18:
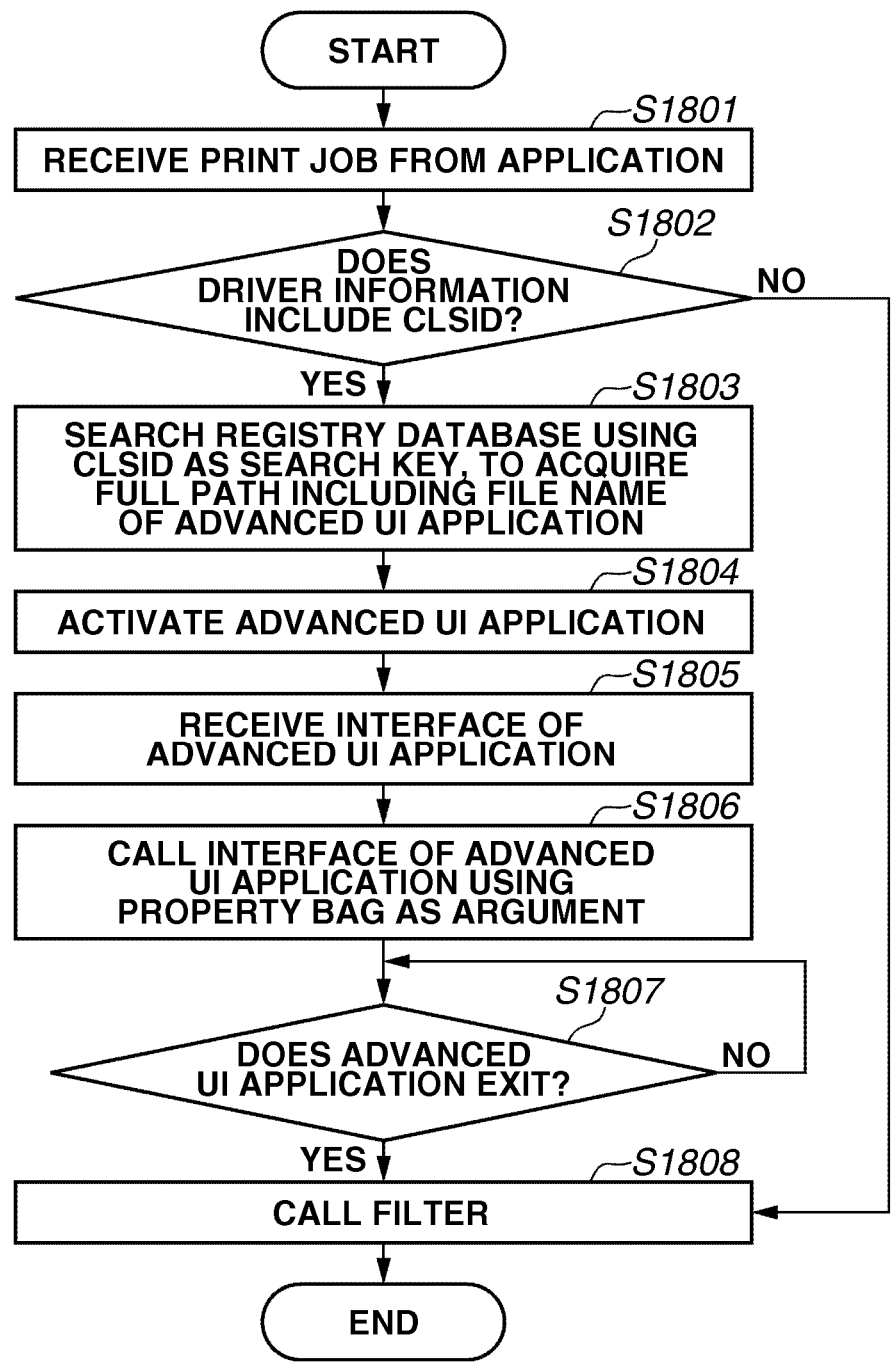
FIG. 18 is a flowchart at the time when the advanced UI application transfers data to the filter pipeline manager in the XPS printing system according to an exemplary embodiment of the present invention.

The data stored in the registry database 308 can also be referred to by using a property bag 414 in the XPS printing system. A transmitting method will be described referring to a block configuration diagram of FIG. 17 and a flowchart of FIG. 18.

In step S1801, the filter pipeline manager 409 receives the XPS spool file 407 serving as a print job when printing is started from the application 1051. The filter pipeline manager 409 also receives model information for specifying which of the printer drivers 1052 is used from the application 1051. The filter pipeline manager 409 searches the registry database 308 based on the model information received from the application 1051.

Driver information described during installation of the printer driver 1052 is written in the registry database 308. The filter pipeline manager 409 acquires driver information corresponding to the received model information.

In step S1802, the filter pipeline manager 409 determines whether the acquired driver information includes the CLSID of the advanced UI application 311. If the CLSID of the advanced UI application 311 does not exist (No in step S1802), the processing proceeds to step S1808. In step S1808, the filter pipeline manager 409 calls the filter, to perform print processing.

If the CLSID of the advanced UI application 311 exists (YES in step S1802), the processing proceeds to step S1803. In step S1803, the filter pipeline manager 409 specifies the CLSID and activation by the out-process server as arguments, and calls the API of the operating system 1053 (see FIG. 16 (1)).

The filter pipeline manager 409 searches the registry database 308 using the specified CLSID as a search key within the API of the operating system 1053. If the advanced UI application 311 has been installed (YES in step S1802), the processing proceeds to step S1803. In step S1803, the filter pipeline manager 409 can acquire a full path including a file name of the advanced UI application 311 from the registry database 308 within the API of the operating system 1053.

If the advanced UI application 311 has not been installed (NO in step S1802), the processing proceeds to step S1808. In step S1808, the filter pipeline manager 409 calls the filter to perform print processing, like when the CLSID does not exist. In step S1804, the filter pipeline manager 409 activates the advanced UI application 311 within the API of the operating system 1053 if it has acquired the full path.

If the /RegSvr option is not added to the activated advanced UI application 311 (NO in step S1501), the processing proceeds to step S1503. In step S1503, the advanced UI application 311 generates a window. The window to be generated at this time point is generated not for display but to wait for response from the filter pipeline manager 409 in a message loop.

In step S1504, the advanced UI application 311 generates an interface object of the advanced UI application 311, and specifies the interface object as an argument, and calls the API of the operating system 1053 (see FIG. 16 (2)).

In step S1805, the filter pipeline manager 409 can receive the interface of the advanced UI application 311. The filter pipeline manager 409, which has received the interface, generates an object of the property bag 414.

In step S1806, the filter pipeline manager 409 calls a method for an interface using the generated property bag 414 as an argument of the interface. In step S1505, the advanced UI application 311 receives the call of the interface and determines whether it is a UI event.

If the called interface is not the UI event (NO in step S1505) because the method is called using the property bag 414 as an argument this time, the processing proceeds to step S1516. In step S1516, the advanced UI application 311 acquires information previously stored from the registry database 308. In step S1517, the advanced UI application 311 acquires the property bag 414 serving as the argument from the interface. In step S1518, the advanced UI application 311 adds a value to the property bag 414.

The property bag 414 is a mechanism to freely add, delete, and refer data by a combination of a name and a value. The advanced UI application 311 adds a configuration of an optional device such as a finisher in a printer, personal information such as a user name and a password, functions generated by the user, e.g., favorites and stamps to the property bag 414.

The advanced UI application 311 ends when the addition of a value to the property bag 414 ends. In step S1807, the filter pipeline manager 409 waits until the advanced UI application 311 ends while displaying the user interface.

If it is confirmed that the advanced UI application 311 ends (YES in step S1807), the processing proceeds to step S1808. Then, the filter pipeline manager 409 receives the property bag 414 that has been changed by the advanced UI application 311. In step S1808, the filter pipeline manager 409 calls the filter, to perform print processing as is conventionally done.

Each of the filters acquires information from the property bag 414, as needed. The filter pipeline manager 409 discards an object of the property bag 414 when the last filter finishes outputting the PDL, so that the object of the property bag 414 is effective only while printing is performed once. Thus, information about the advanced UI application 311 is transmitted to the filter.

The advanced UI application 311 cannot operate using Point and Print for downloading the printer driver 1052 to the clients 201 and 202 from the server 203 and operating the downloaded printer driver 1052, i.e., what is called a shared printer when used.

In a network environment as illustrated in FIG. 2, the clients 201 and 202 can download the printer driver 1052 corresponding to the shared printer from the server 203. If the configuration module 304 includes the user interface, therefore, the clients 201 and 202 can display the user interface.

However, the advanced UI application 311 cannot be downloaded to the clients 201 and 202 because it is different from the printer driver 1052. While a remote procedure call (RPC) can perform communication between the server 203 and the clients 201 and 202, the advanced UI application 311 is activated with the server 203 if it remains unchanged. Therefore, the user cannot operate the user interface on the clients 201 and 202.

In an environment where the advanced UI application 311 is installed, the shared printer is prevented from being used. A mechanism to prevent the shared printer from being used will be described with reference to FIGS. 19 and 20, and flowchart of FIG. 21.

In step S2101, the operating system 1053 is called from the user to display a shared tab among printer drivers 1052. The operating system 1053 also receives model information for specifying which of the printer drivers 1052 is used.

The operating system 1053 searches the registry database 308 based on the received model information. Driver information described during installation of the printer driver 1052 is written in the registry database 308. The operating system 1053 acquires driver information corresponding to the specified model information.

Figure 20:
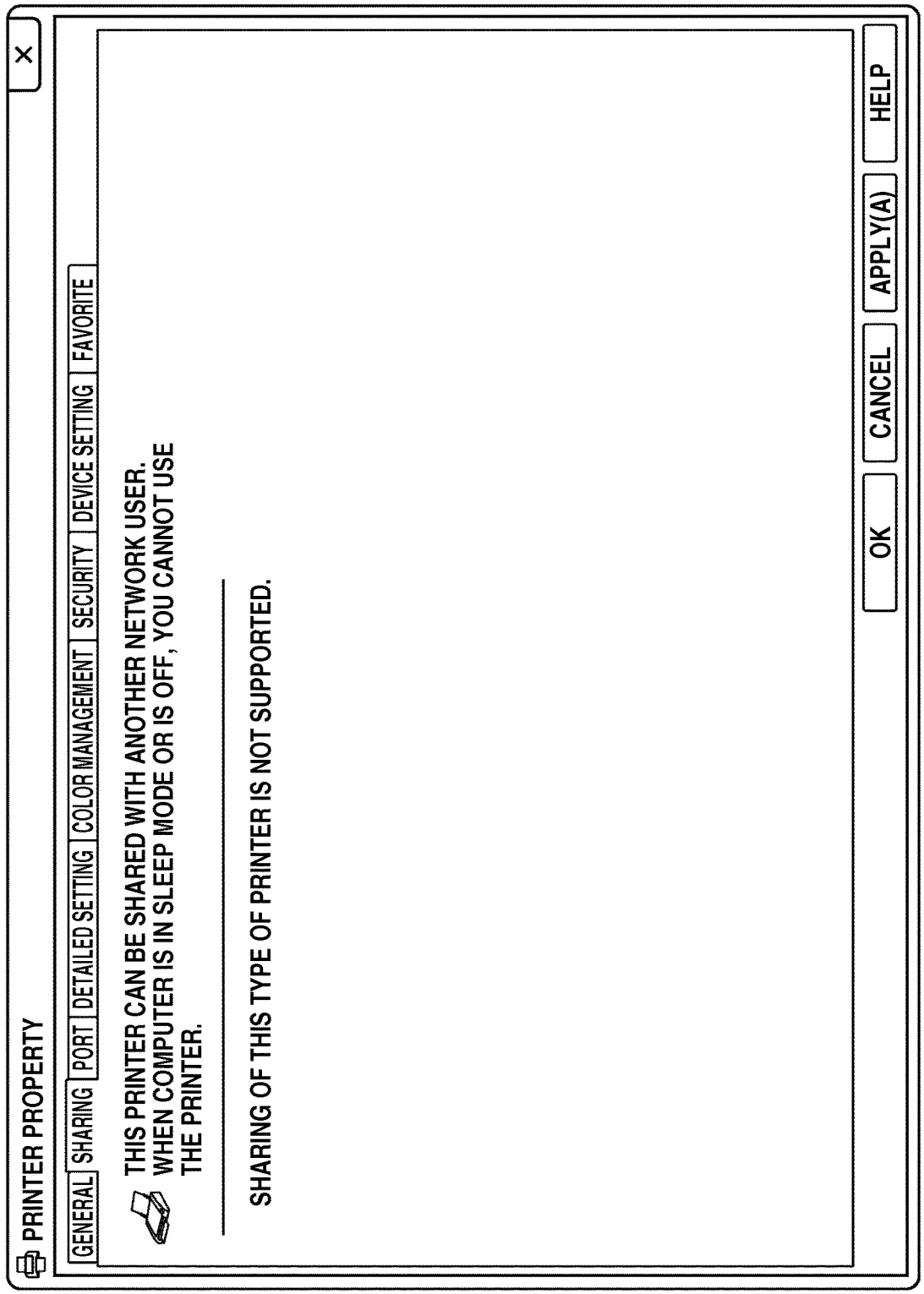
FIG. 20 illustrates a user interface of an operating system for inhibiting a shared printer in the printer driver including the advanced UI application according to an exemplary embodiment of the present invention.
Figure 21:
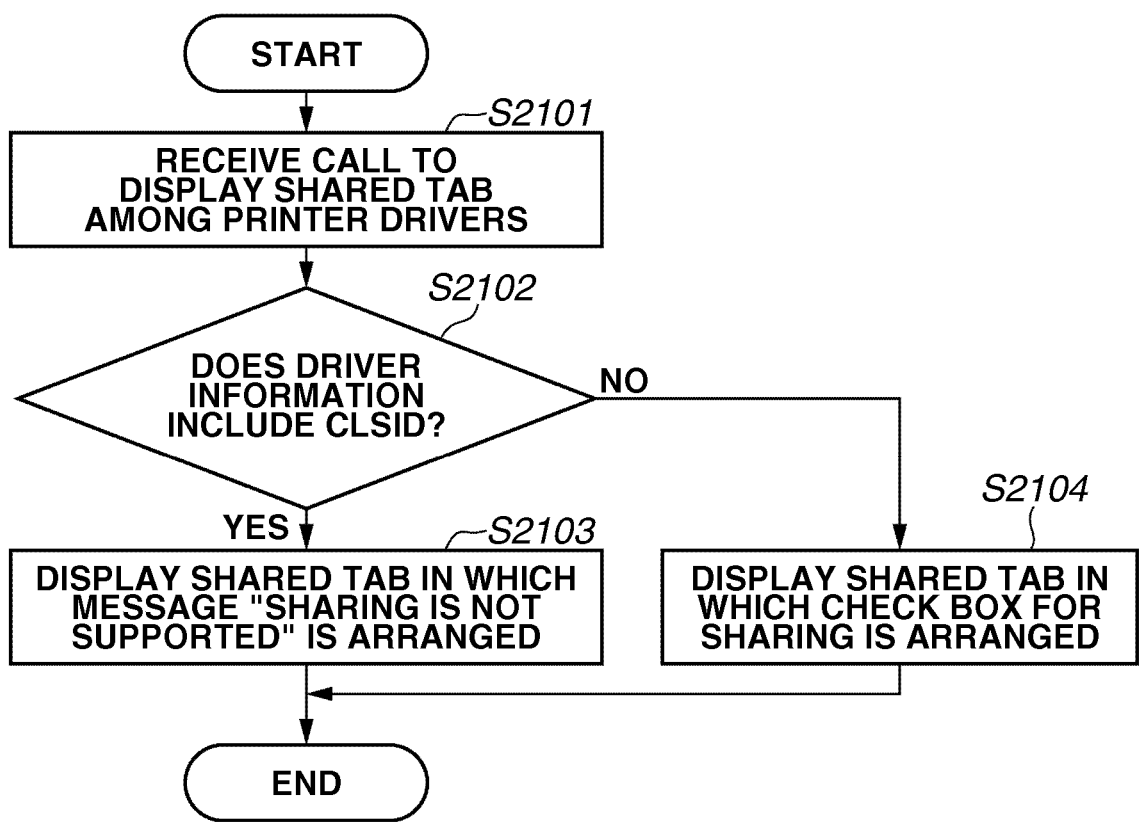
FIG. 21 is a flowchart at the time when the operating system displays a shared tab among printer drivers according to an exemplary embodiment of the present invention.

In step S2102, the operating system 1053 determines whether the acquired driver information includes the CLSID of the advanced UI application 311. If the CLSID exists (YES in step S2102), the processing proceeds to step S2103 because the operating system 1053 uses the advanced UI application 311, to display the user interface. In step S2103, the operating system 1053 displays a shared tab in which a message "sharing is not supported" is arranged not to specify sharing setting (FIG. 20).

Figure 19:
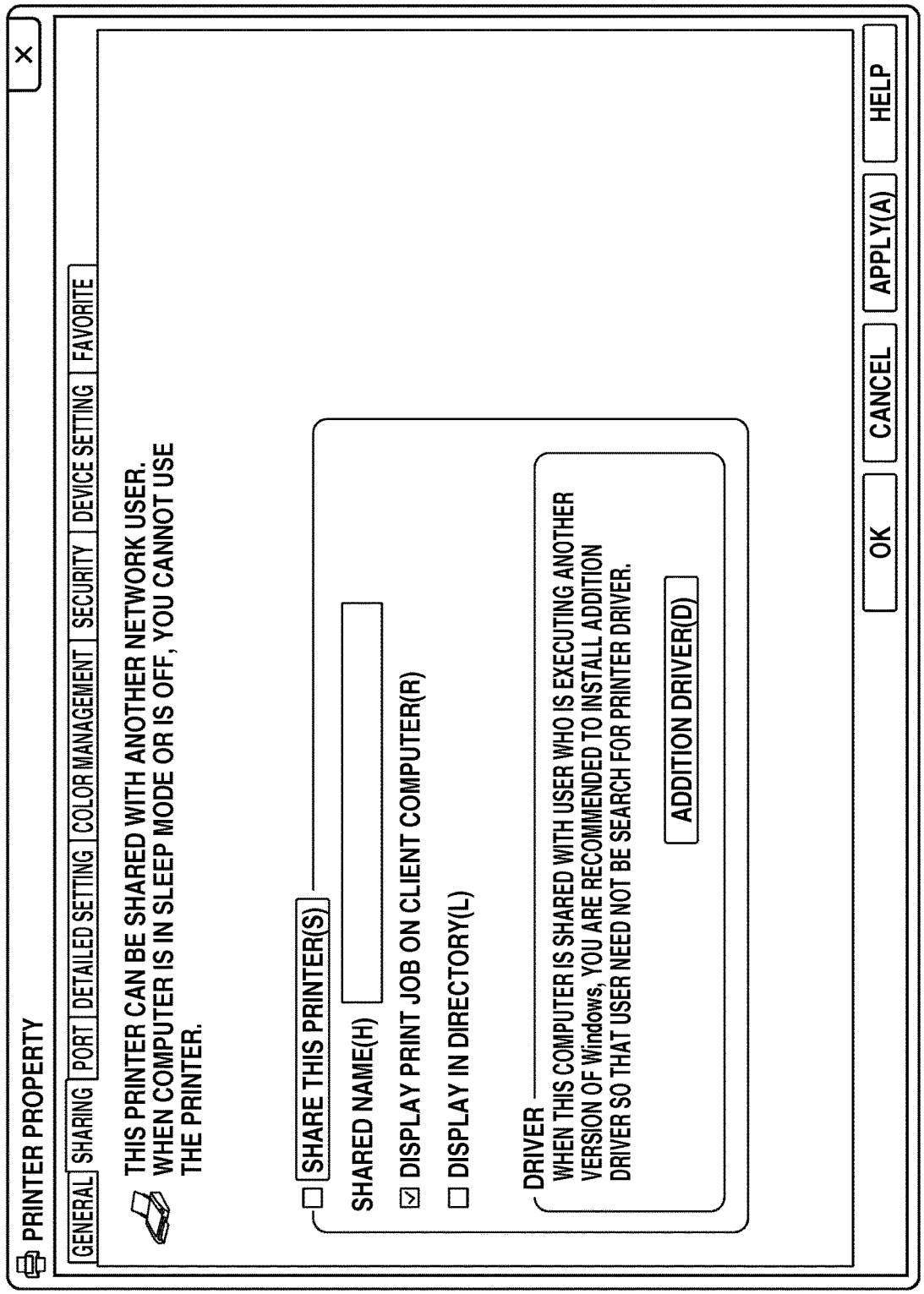
FIG. 19 illustrates a user interface of an operating system for using a shared printer in the printer driver according to an exemplary embodiment of the present invention.

A check box for sharing a printer illustrated in FIG. 19 may be grayed out. If the CLSID does not exist (NO in step S2102), the processing proceeds to step S2104. In step S2104, the operating system 1053 displays a shared tab in which a check box for sharing is arranged (see FIG. 19).

When the advanced UI application 311 is used, the CPSUI 801 does not generate a base of a property sheet. Therefore, the operating system 1053 can freely generate the user interface.

However, a user interface, to which the operating system 1053 adds the base of the property sheet and some tabs, and the configuration module 304 in the printer driver 1052 then further adds a tab, cannot be generated. Examples of the user interface include a user interface for confirming device setting and a user interface for confirming job setting.

In such a case, the advanced UI application 311 cannot generate such a user interface. Therefore, a method for displaying a button on the user interface will be described with reference to FIGS. 22 and 23, and a flowchart illustrated in FIG. 24.

In step S2401, the operating system 1053 is called from (by) the user to display the user interfaces for confirming device setting and job setting. The operating system 1053 also receives model information for specifying which of the printer drivers 1052 is used.

The operating system 1053 searches the registry database 308 based on the received model information. Driver information described during installation of the printer driver 1052 is written in the registry database 308. The operating system 1053 acquires the driver information corresponding to the received model information.

In step S2402, the operating system 1053 determines whether the acquired driver information includes the CLSID of the advanced UI application 311. If the CLSID exists (YES in step S2402), the processing proceeds to step S2403.

In step S2403, the operating system 1053 displays a tab in which a button for opening a user interface of the advanced UI application 311 is arranged.

If the CLSID does not exist (NO in step S2402), the processing proceeds to step S2404. In step S2404, the operating system 1053 calls the configuration module 304 in the printer driver 1052, to add a tab.

Figure 23:
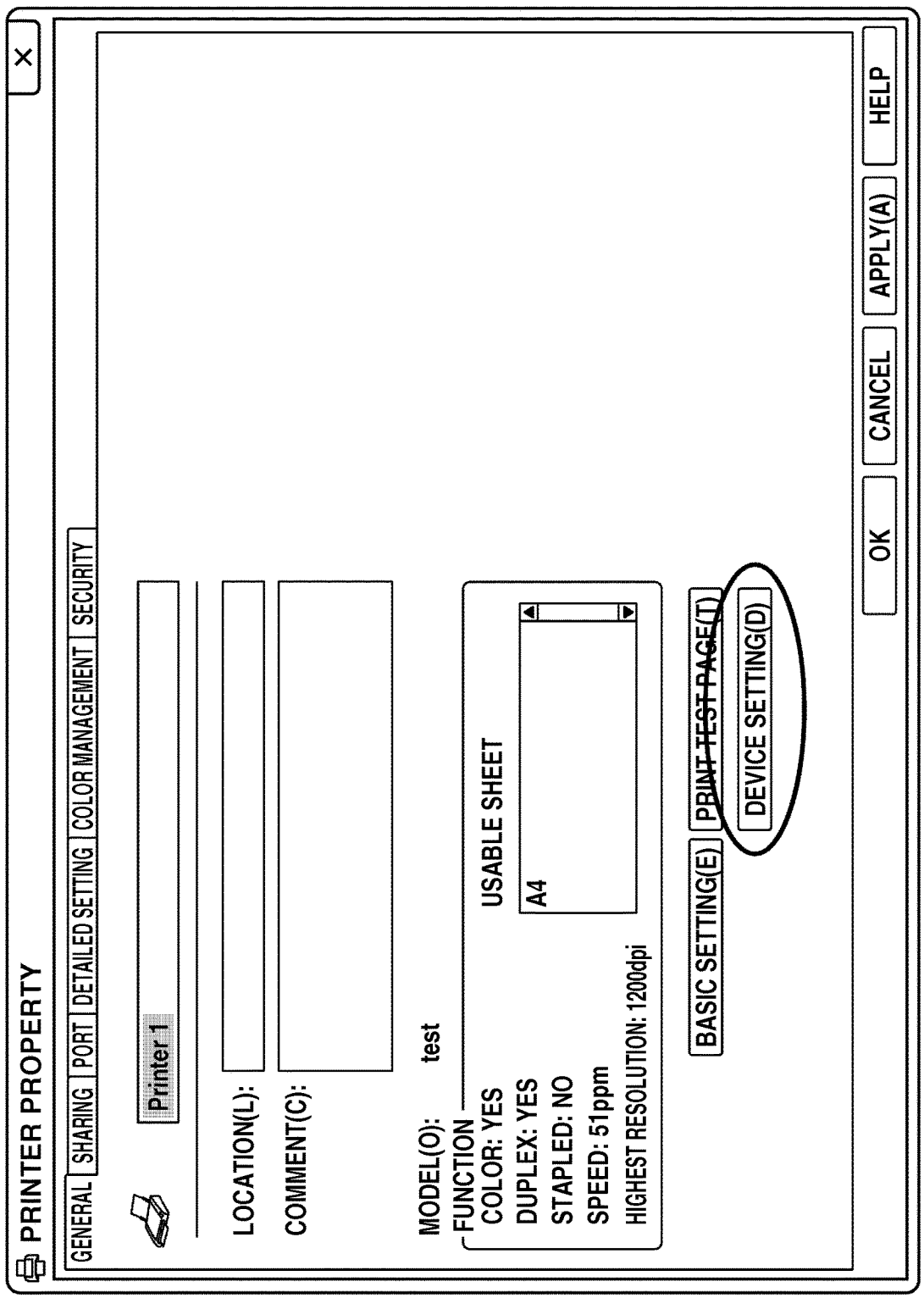
FIG. 23 illustrates a user interface of the operating system at the time when device setting is made in the printer driver including the advanced UI application according to an exemplary embodiment of the present invention.
Figure 24:
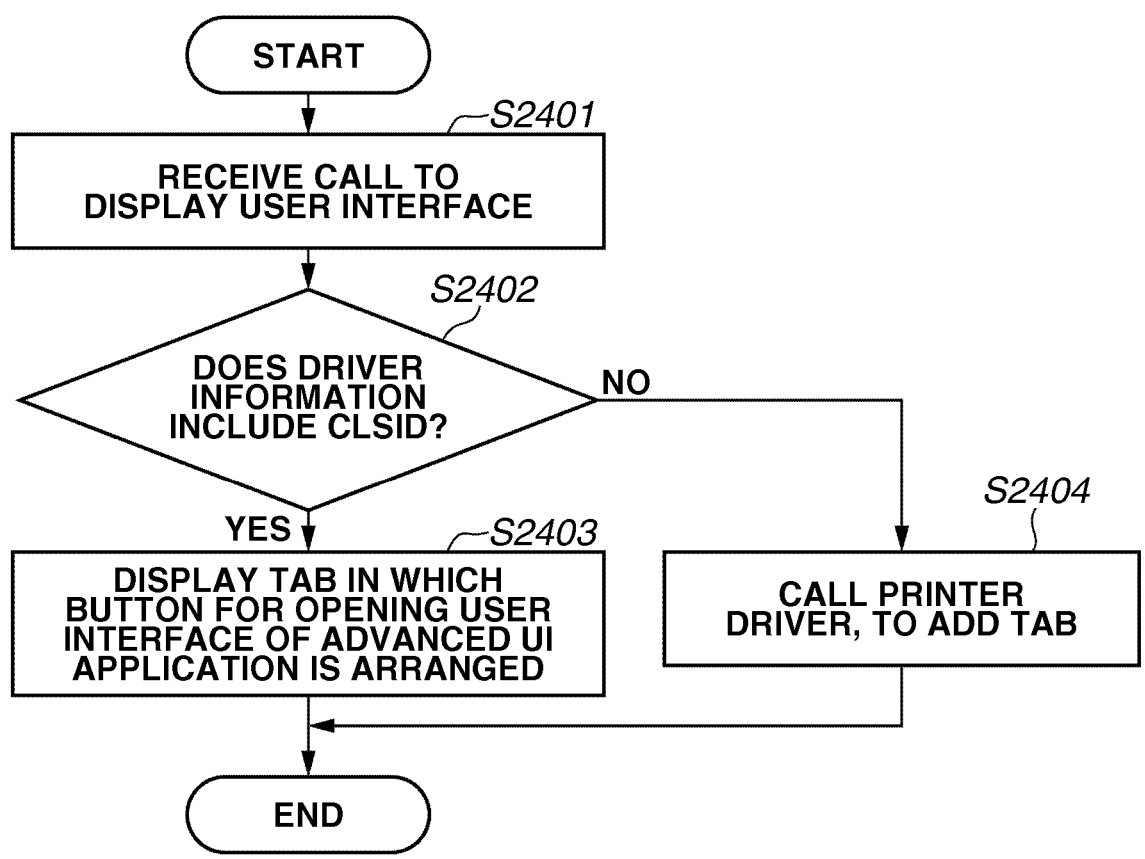
FIG. 24 is a flowchart at the time when the operating system displays the user interface of the printer driver according to an exemplary embodiment of the present invention.

In FIG. 22, a button for basic setting is displayed on a user interface for confirming job setting, to call the user interface for confirming job setting of the advanced UI application 311. In FIG. 23, a button for confirming device setting is displayed on a user interface for device setting, to call the user interface for device setting of the advanced UI application 311.

In the above-mentioned manner, the user interface is separated from the printer driver 1052 in the form of the advanced UI application 311 so that the application 1051 can be prevented from being involved even if the user interface crashes.

The system does not depend on the CPSUI 801 so that a user interface, which is not a property sheet, can be freely generated. Communication between different processes is performed using the COM without using a named pipe and a shared memory, so that the number of codes dependent on the operating system 1053 can be reduced in the advanced UI application 311.

Figure 25:
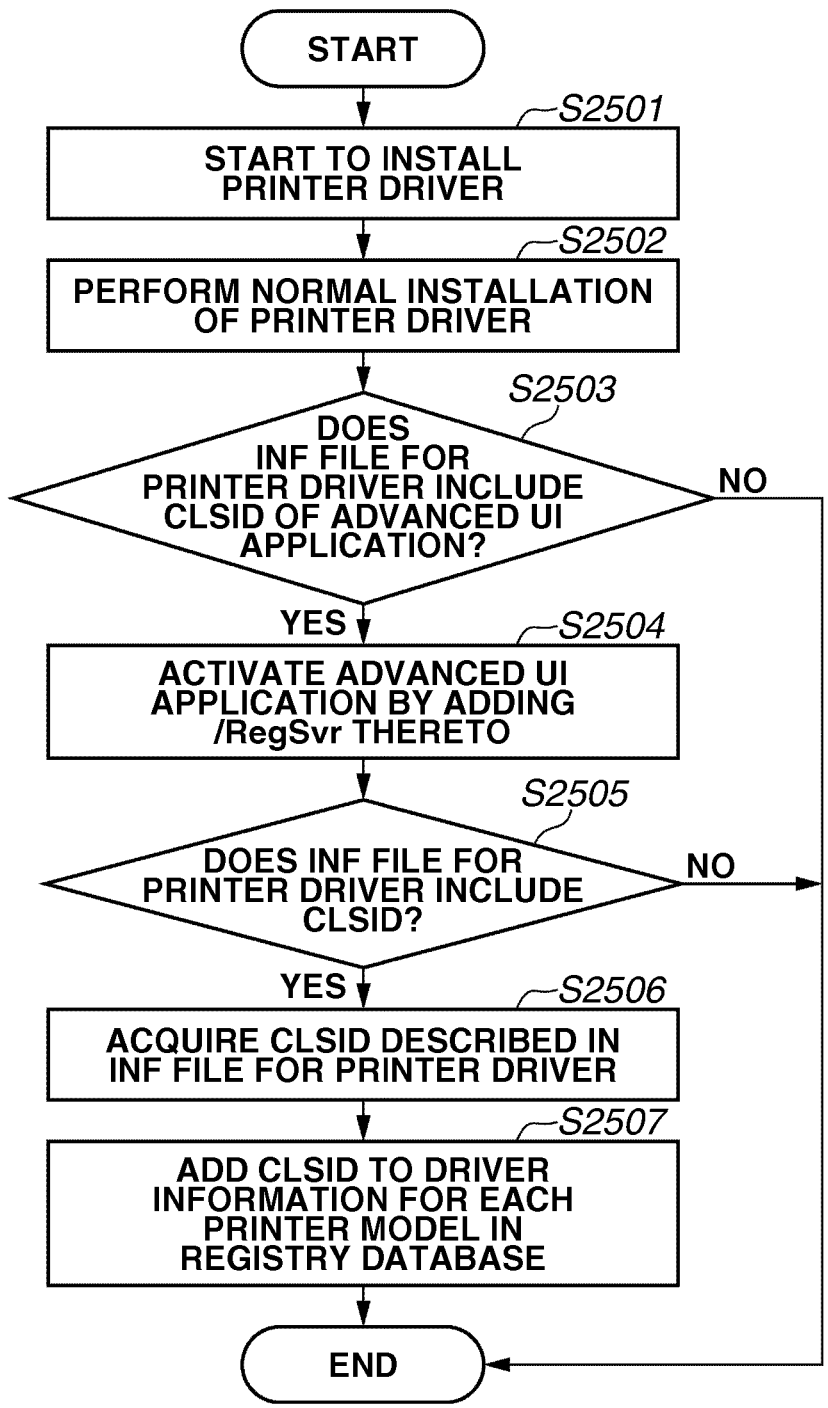
FIG. 25 is a flowchart at the time when the operating system installs the printer driver including the advanced UI application according to an exemplary embodiment of the present invention.

While the advanced UI application 311 performs installation separately from the installation set for the printer driver 1052 in the first exemplary embodiment, an advanced UI application 311 can also be included in an installation set for a printer driver 1052 in a second exemplary embodiment. The installation of the printer driver 1052 performed when the advanced UI application 311 is included in the installation set for the printer driver 1052 will be described with reference to a flowchart of FIG. 25 and FIG. 26.

The printer driver 1052 is installed into an operating system 1053 according to a setup information file (hereinafter referred to as an INF file) illustrated in FIG. 26. The INF file contains an application file name of the advanced UI application 311 in addition to a CLSID of the advanced UI application 311 described in the first exemplary embodiment.

In step S2501, the operation system 1053 starts to install the printer driver 1052. The operating system 1053 searches for an installation set for the printer driver 1052 in a specified model. While the installation set includes one that is incorporated in the operating system 1053, it may be specified by the user, or may be provided from a previously identified distribution server or the like.

In step S2502, the operating system 1053 copies a file based on the INF file included in the installation set, and writes required driver information into the registry database 308, to complete normal installation of the printer driver 1052.

In step S2503, the operating system 1053 then determines whether the INF file for the printer driver 1052 includes a file name of the advanced UI application 311. In FIG. 26, a key AdvancedUI corresponds to the file name of the advanced UI application 311.

If the file name of the advanced UI application 311 exists (YES in step S2503), the processing proceeds to step S2504. In step S2504, the operating system 1053 activates the advanced UI application 311 by adding a /RegSvr option thereto as an argument.

In step S2505, the operating system 1053 confirms whether the INF file includes the CLSID of the advanced UI application 311. If the CLSID of the advanced UI application 311 exists (YES in step S2505), the processing proceeds to step S2506. In step S2506, the operation system 1053 acquires the CLSID from the INF file.

In step S2507, the operating system 1053 adds the CLSID of the advanced UI application 311 to the driver information in the registry database 308. The installation of the printer driver 1052 as well as installation of the advanced UI application 311 is completed.

As described above, if the advanced UI application 311 is added to the installation set for the printer driver 1052, a user can use a user interface, which is activated in a different process, only by installing the printer driver 1052 without separately adding the advanced UI application 311 later.

As described above, according to the present exemplary embodiments, the user interface of the printer driver 1052 is activated in a different process from a process executed by an application 1051. Therefore, the user interface is prevented from being caused to crash by involving even the application 1051.

The operating system 1053 need not prepare a base. Therefore, the user interface of the printer driver 1052 can be freely designed and arranged.

The advanced UI application 311 can be installed separately from the printer driver 1052. Therefore, only the user interface can be changed without updating the printer driver 1052.

A memory area differs for each process. Therefore, more memory areas can be used. A rich user interface using a moving image and three dimensions (3D) can also be generated.

Aspects of the present invention can also be realized by a computer of a system or apparatus (or devices such as a CPU or MPU) that reads out and executes a program recorded on a memory device to perform the functions of the above-described embodiment (s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

What is claimed is:

1. An information processing apparatus including an operating system and an application, the apparatus comprising:
a printer driver;
another application that provides a user interface that enables a user to perform print setting; and
a file that includes first information corresponding to said another application and includes second information corresponding to the printer driver so that the operating system registers the first information and the second information in a registry of the operating system,
wherein the registration enables the operating system to, based on a predetermined interface being called from the included application in a situation that a printer corresponding to the printer driver is specified to be used, activate said another application without calling the printer driver.

2. The information processing apparatus according to claim 1, wherein the included application and said another application perform interprocess communication with each other.

3. The information processing apparatus according to claim 1, wherein the registration of the first information and the activation of said another application are performed by the operating system in the information processing apparatus.

4. The information processing apparatus according to claim 1, wherein the registration enables the operating system to activate, based on a predetermined interface being called from the included application in the situation that the printer driver is specified to be used, said another application in a process different from a process in which the included application runs.

5. The information processing apparatus according to claim 4, wherein the first information is a file path of said another application.

6. The information processing apparatus according to claim 1, wherein the operating system calls a common property sheet user interface without activating said another application based on the predetermined interface being called from the included application in a case that the first information is not registered in the registry.

7. The information processing apparatus according to claim 1, wherein the first information is an identifier of said another application.

8. The information processing apparatus according to claim 1, wherein the predetermined interface is a predetermined application interface.

9. The information processing apparatus according to claim 1, wherein by providing of the file, the first information and the second information are registered in association with each other.

10. The information processing apparatus according to claim 1, wherein the registration enables the operating system to activate, based on the predetermined interface being called from the included application in the situation that the printer driver is specified to be used, said another application not via the printer driver.

11. The information processing apparatus according to claim 1, wherein the another application and the file are provided to the information processing apparatus along with the provision of the printer driver.

12. A control method for controlling an information processing apparatus including an operating system and an application, the control method comprising:
providing a printer driver;
providing another application that provides a user interface that enables a user to perform print setting; and
providing a file that includes first information corresponding to said another application and includes second information corresponding to the printer driver so that the operating system registers the first information and the second information in a registry of the operating system,
wherein the registration enables the operating system to, based on a predetermined interface being called from the included application in a situation that a printer corresponding to the printer driver is specified to be used, activate said another application without calling the printer driver.

13. The control method according to claim 12, wherein the included application and said another application perform interprocess communication with each other.

14. The control method according to claim 12, wherein the registration of the first information and the activation of said another application are performed by the operating system in the information processing apparatus.

15. The control method according to claim 12, wherein the registration enables the operating system to active, based on a predetermined interface being called from the included application in the situation that the printer driver is specified to be used, said another application in a process different from a process in which the included application runs.

16. The control method according to claim 12, wherein the first information is a file path of said another application.

17. The control method according to claim 12, wherein the operating system calls a common property sheet user interface without activating said another application based on the predetermined interface being called from the included application in a case that the first information is not registered in the registry.

18. The control method according to claim 12, wherein the first information is an identifier of said another application.

19. The control method according to claim 12, wherein the predetermined interface is a predetermined application interface.

20. The control method according to claim 12, wherein by the providing of the file, the first information and the second information are registered in association with each other.

21. The control method according to claim 12, wherein the registration enables the operating system to activate, based on the predetermined interface being called from the included application in the situation that the printer driver is specified to be used, said another application not via the printer driver.

22. The control method according to claim 12, wherein the first information identifies said another application, and the second information identifies the printer driver.

23. The control method according to claim 12, wherein said another application is separate from the printer driver.

24. The control method according to claim 12, wherein the another application and the file are provided to the information processing apparatus along with the provision of the printer driver.

25. A non-transitory storage medium storing instructions for executing a control method for controlling an information processing apparatus including an operating system and an application, the control method comprising:
provided a printer driver;
providing another application that provides a user interface that enables a user to perform print setting; and
providing a file that includes first information corresponding to said another application and includes second information corresponding to the printer driver so that the operating system registers the first information and the second information in a registry of the operating system,
wherein the registration enables the operating system to, based on a predetermined interface being called from the included application in a situation that a printer corresponding to the printer driver is specified to be used, activate said another application without calling the printer driver.

26. The non-transitory storage medium according to claim 25, wherein the another application and the file are provided to the information processing apparatus along with the provision of the printer driver.

27. A control method for controlling an information processing apparatus including an operating system, the control method comprising:
providing a printer driver;
providing an application that provides a user interface that enables a user to perform print settings to be used by the printer driver to generate print data to be provided to a printer; and
providing a file that includes first information corresponding to the application and includes second information corresponding to the printer driver so that the operating system registers the first information and the second information in a registry of the operating system,
wherein the registration enables the operating system to, based on a user interface for print setting being called in a situation that the printer corresponding to the printer driver is specified to be used, activate the application without calling the printer driver.

28. The control method according to claim 27, wherein the another application and the file are provided to the information processing apparatus along with the provision of the printer driver.

* * * * *